United States Patent [19]
Bassetti, Jr.

[11] Patent Number: 5,122,783
[45] Date of Patent: Jun. 16, 1992

[54] SYSTEM AND METHOD FOR BLINKING DIGITALLY-COMMANDED PIXELS OF A DISPLAY SCREEN TO PRODUCE A PALETTE OF MANY COLORS

[75] Inventor: Chester F. Bassetti, Jr., Pleasanton, Calif.

[73] Assignee: Cirrus Logic, Inc., Fremont, Calif.

[21] Appl. No.: 558,903

[22] Filed: Jul. 27, 1990

Related U.S. Application Data

[63] Continuation-in-part of Ser. No. 335,622, Apr. 10, 1989.

[51] Int. Cl.⁵ .............................................. G09G 1/28
[52] U.S. Cl. .................................... 340/701; 340/703; 340/793
[58] Field of Search .............. 340/793, 767, 701, 703

[56] References Cited

U.S. PATENT DOCUMENTS

| | | | |
|---|---|---|---|
| 4,427,979 | 1/1984 | Clerc et al. | 340/793 |
| 4,488,150 | 12/1984 | Kanatani | 340/793 |
| 4,516,118 | 5/1985 | Wahlquist | 340/793 |
| 4,709,995 | 12/1987 | Kuribayashi et al. | 340/793 |

OTHER PUBLICATIONS

S-MOS Systems, Inc. sales brochure for "Dragon Graphic Chip Sets" (Preliminary), undated.

Primary Examiner—Jeffery A. Brier
Attorney, Agent, or Firm—Limbach & Limbach

[57] ABSTRACT

A frame rate duty cycle technique and dithering technique is applied to the output of a color look-up RAM in order to drive various flat panel displays. An integrated circuit chip in accordance with the invention includes a modulo-N gray scaling unit, where the value N is variable as well as a pixels dithering unit and a color mixing unit. A brightness spreading memory is included for mapping CRT drive values into LCD drive values.

18 Claims, 19 Drawing Sheets

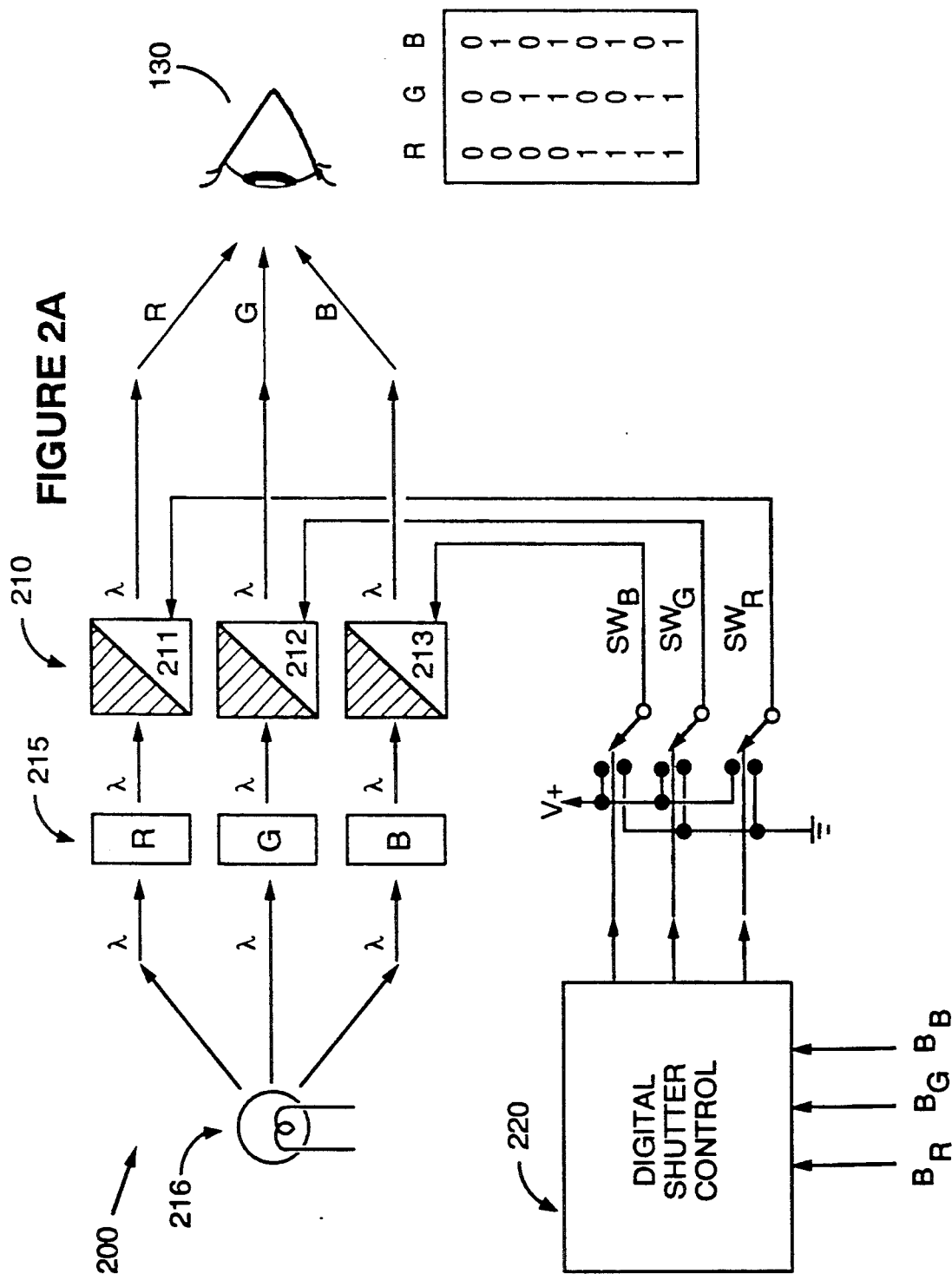

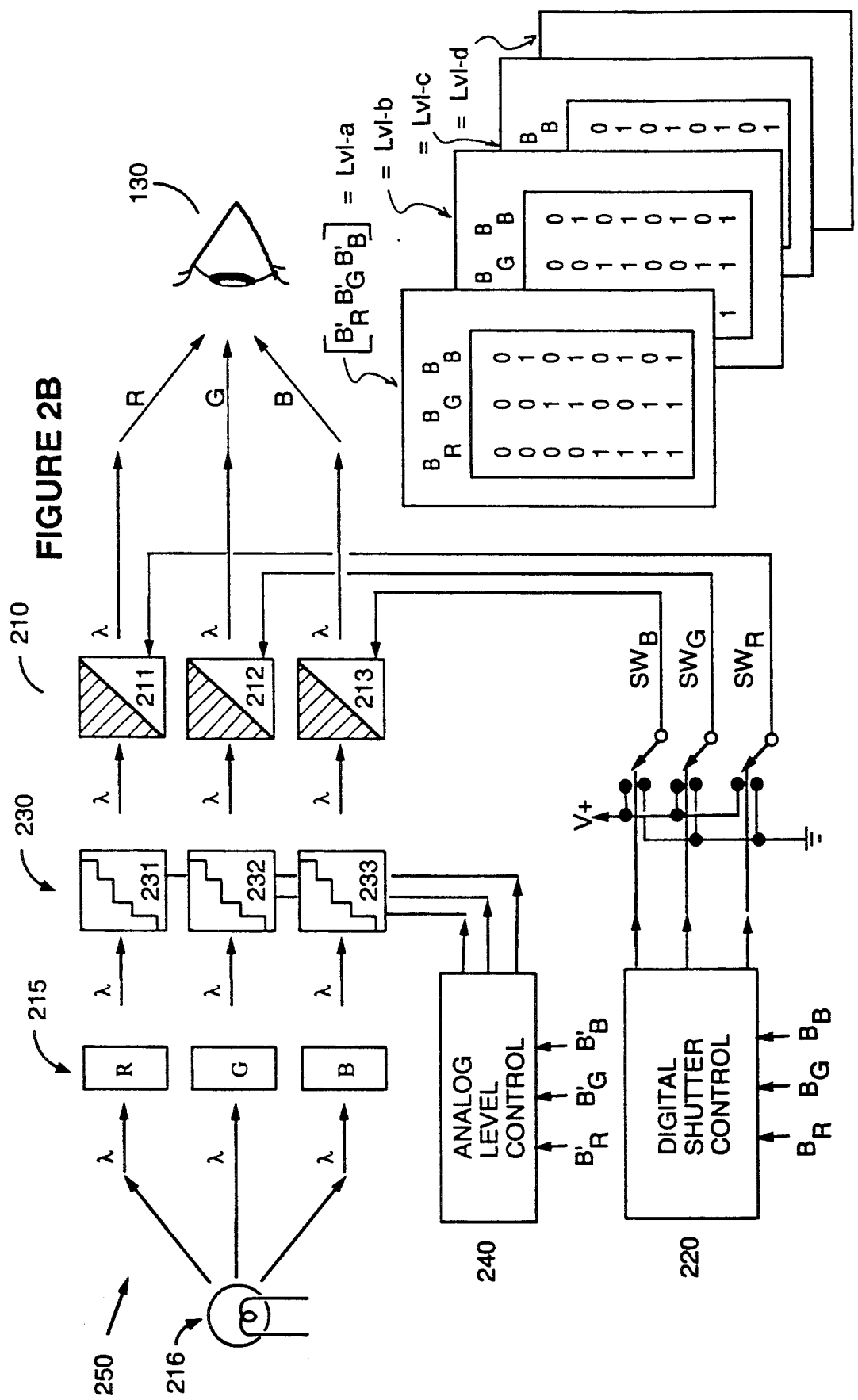

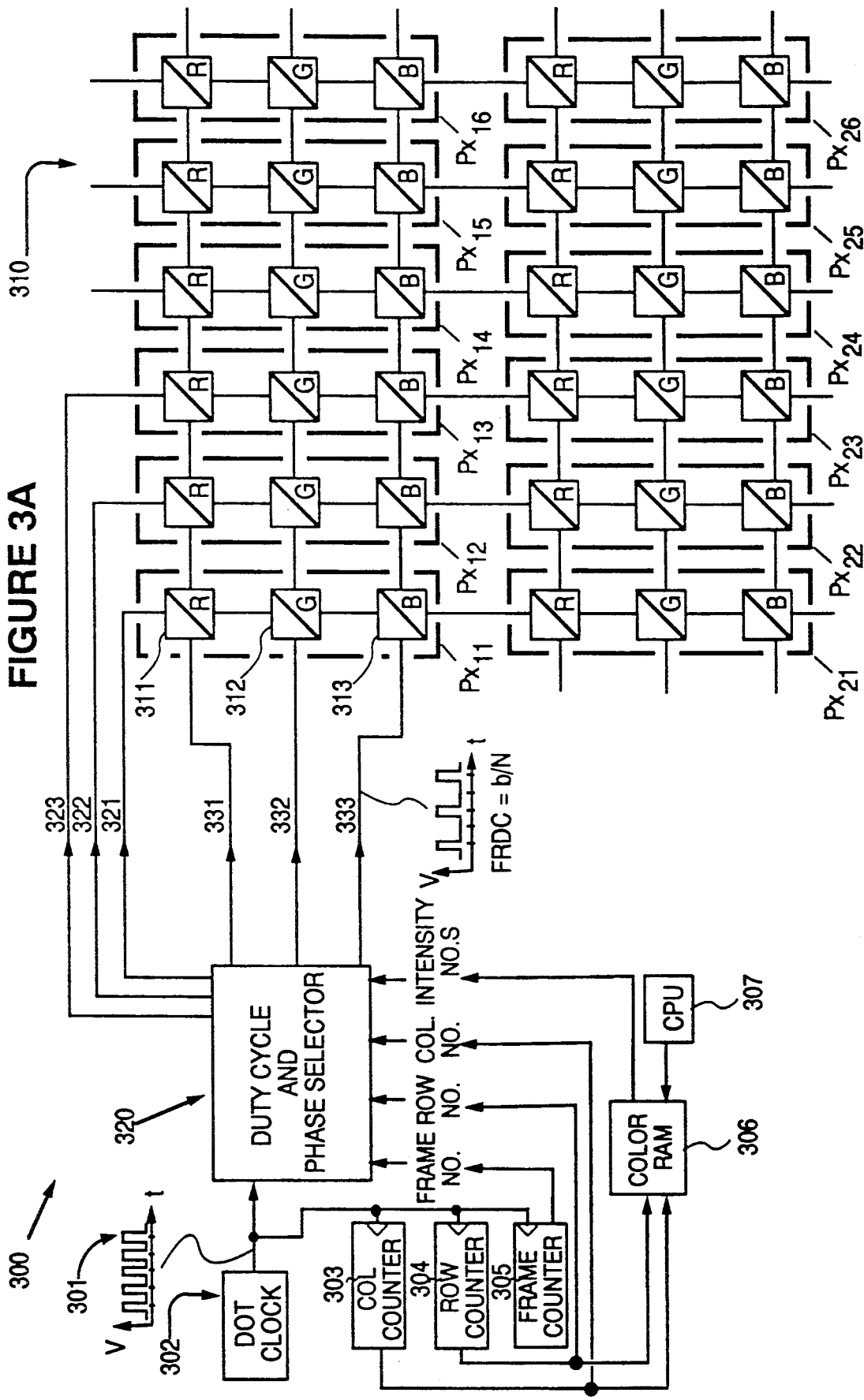

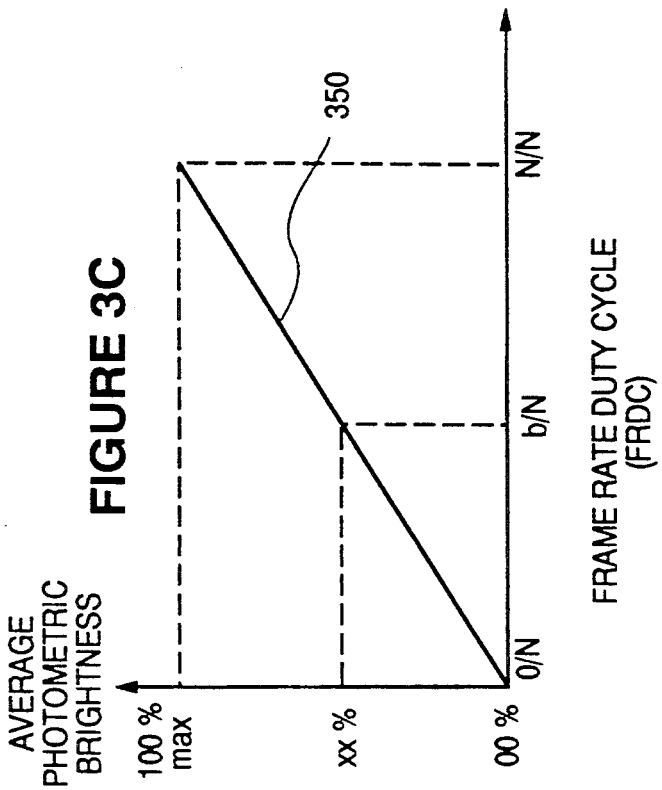
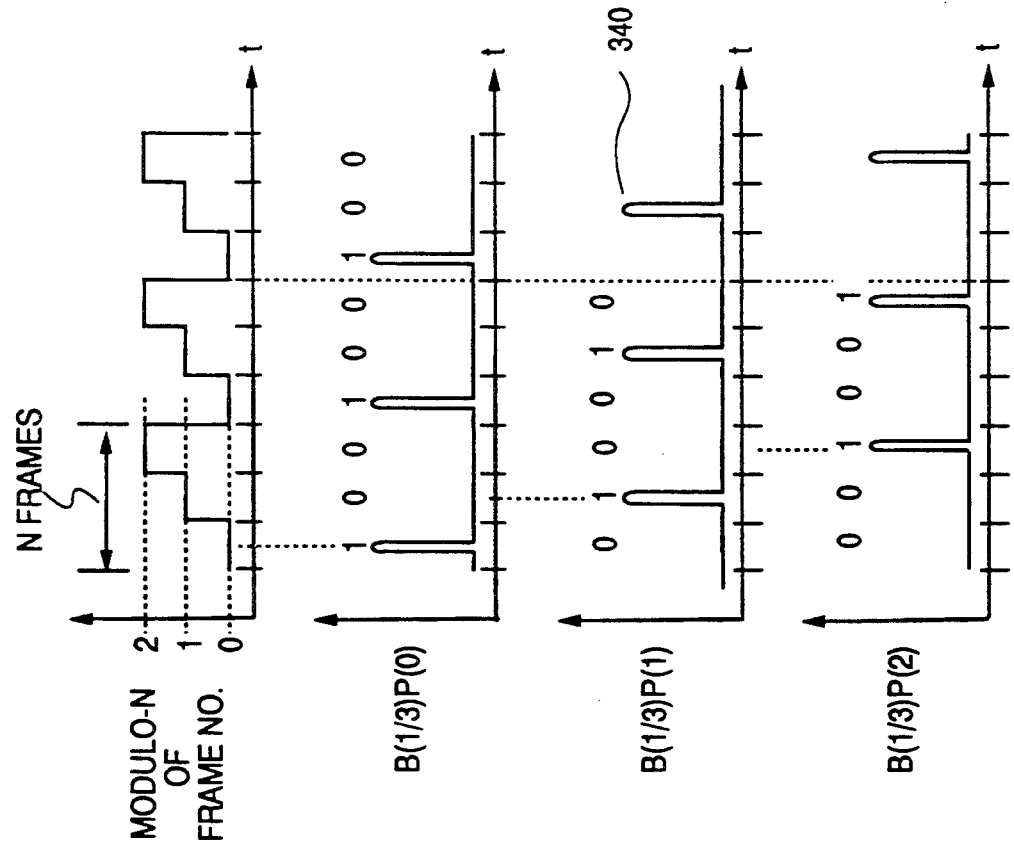

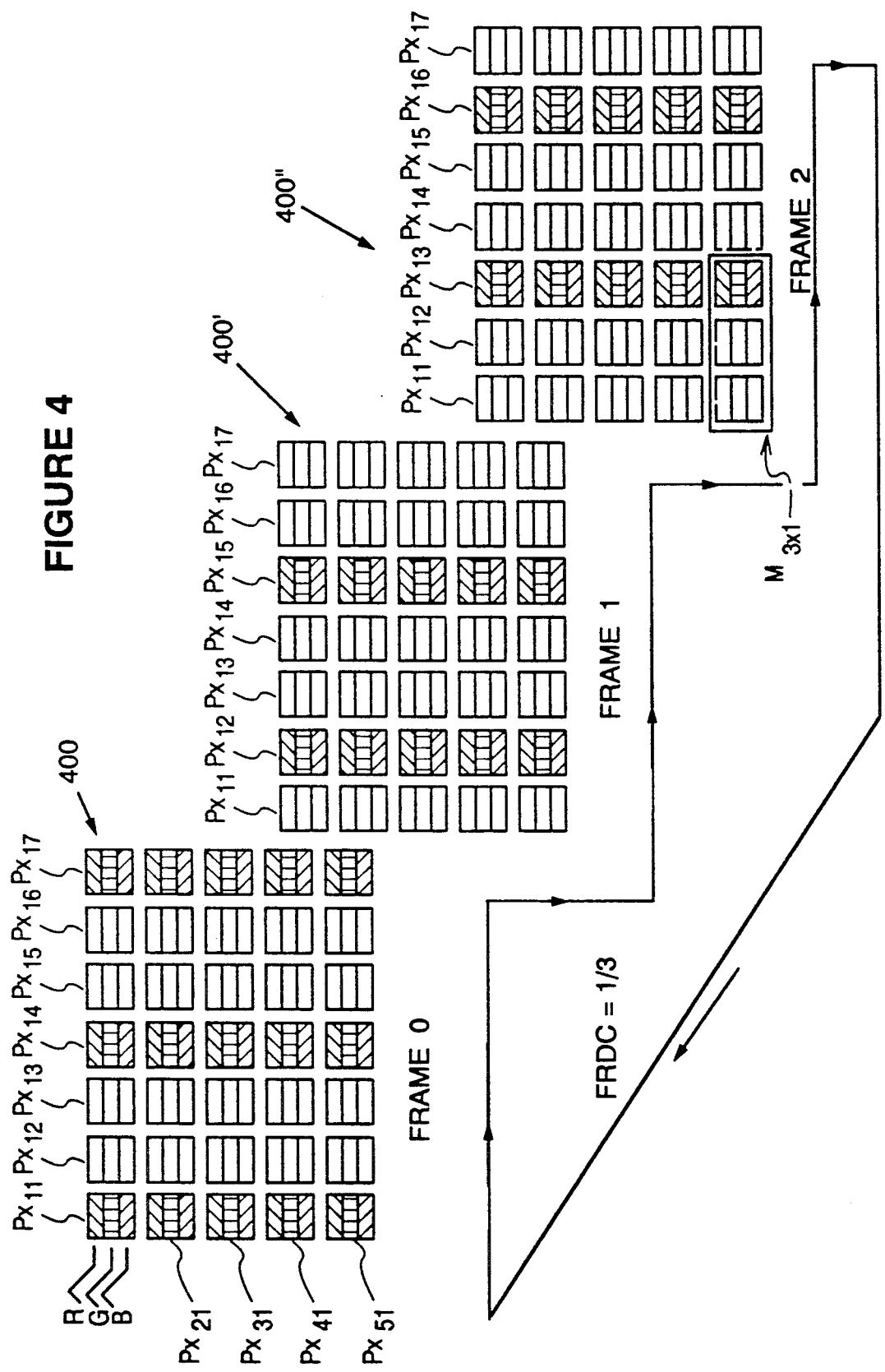

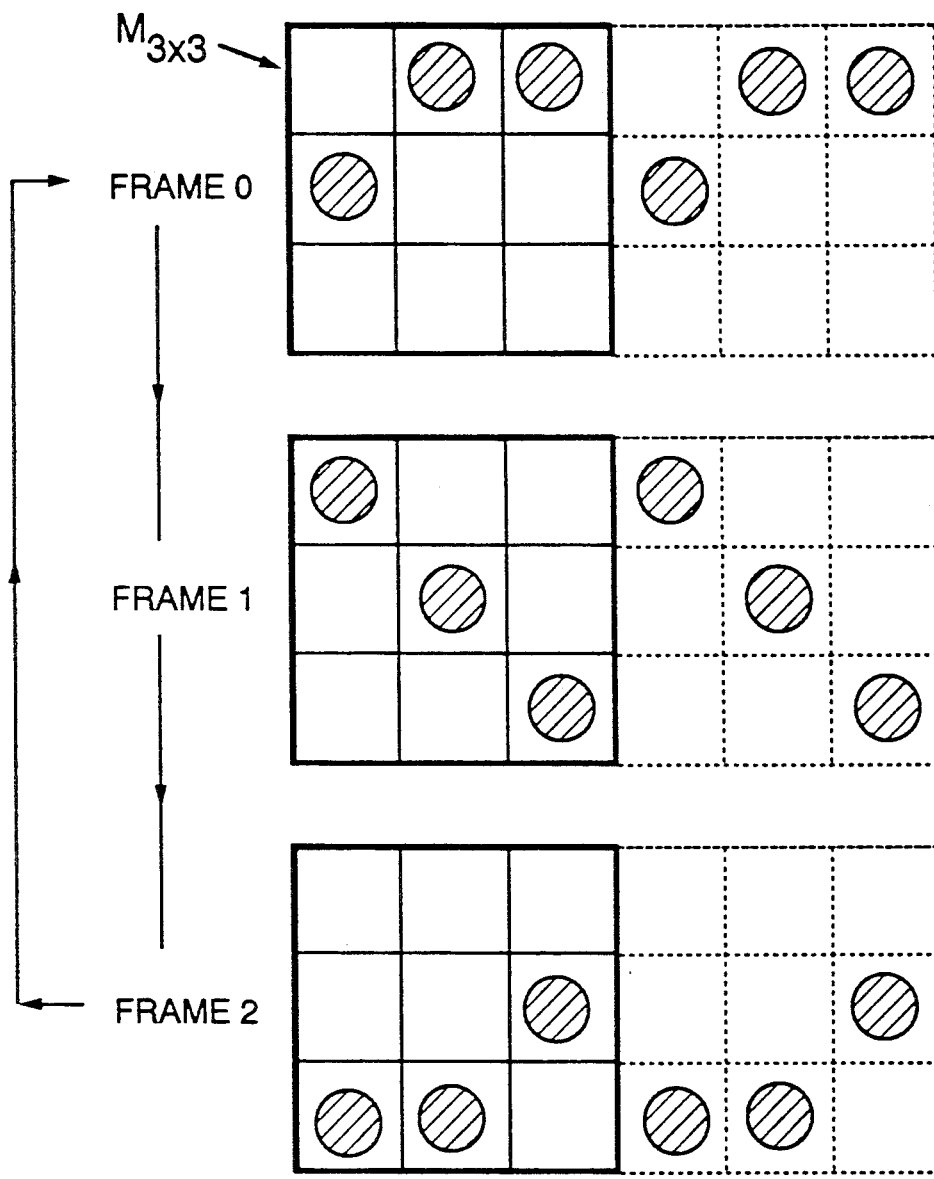

MODULO-N COUNTER

MODULO-N ADDER

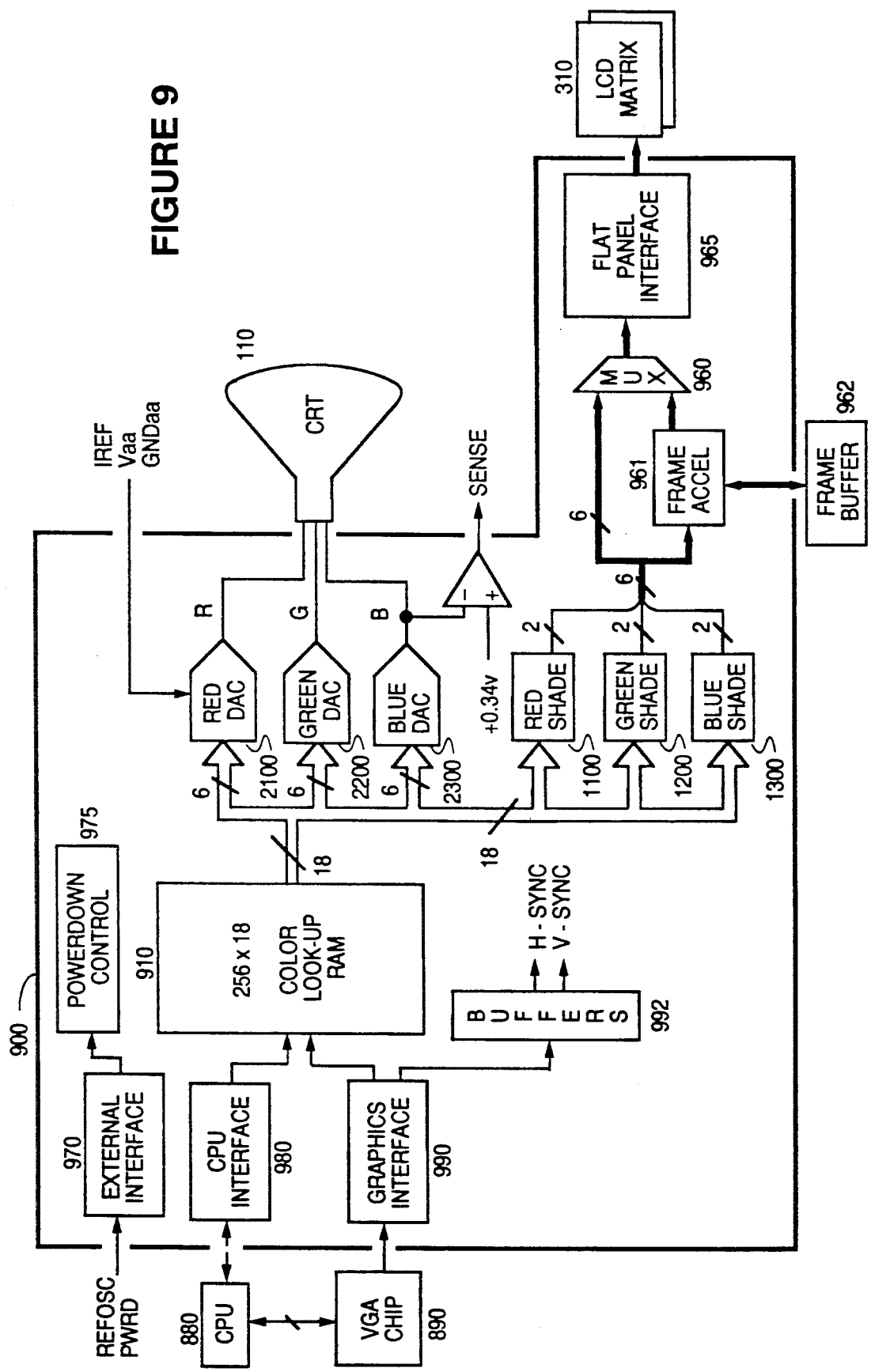

G/S UNIT SELECTING MODULE

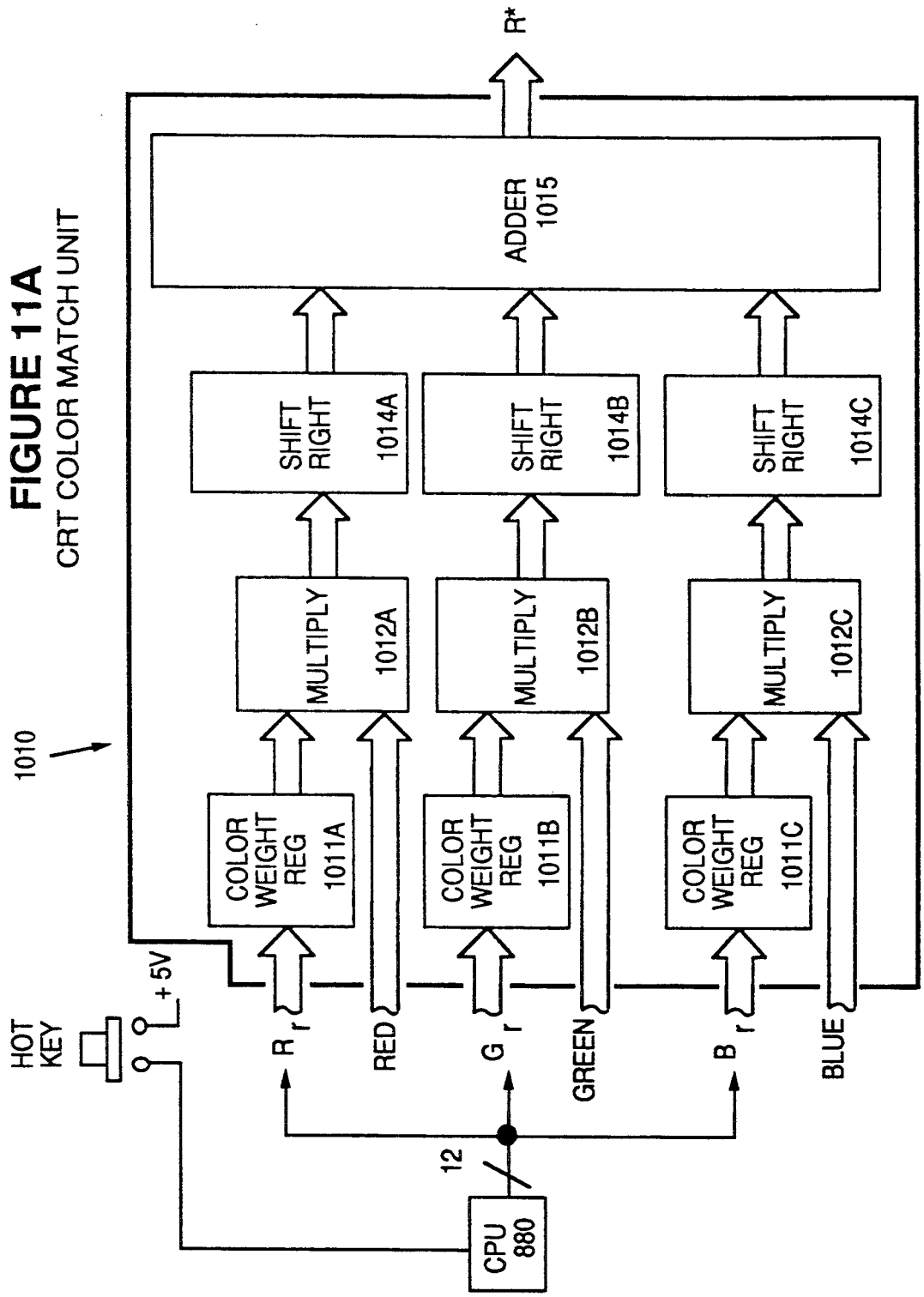

LSB STRIP OFF UNIT

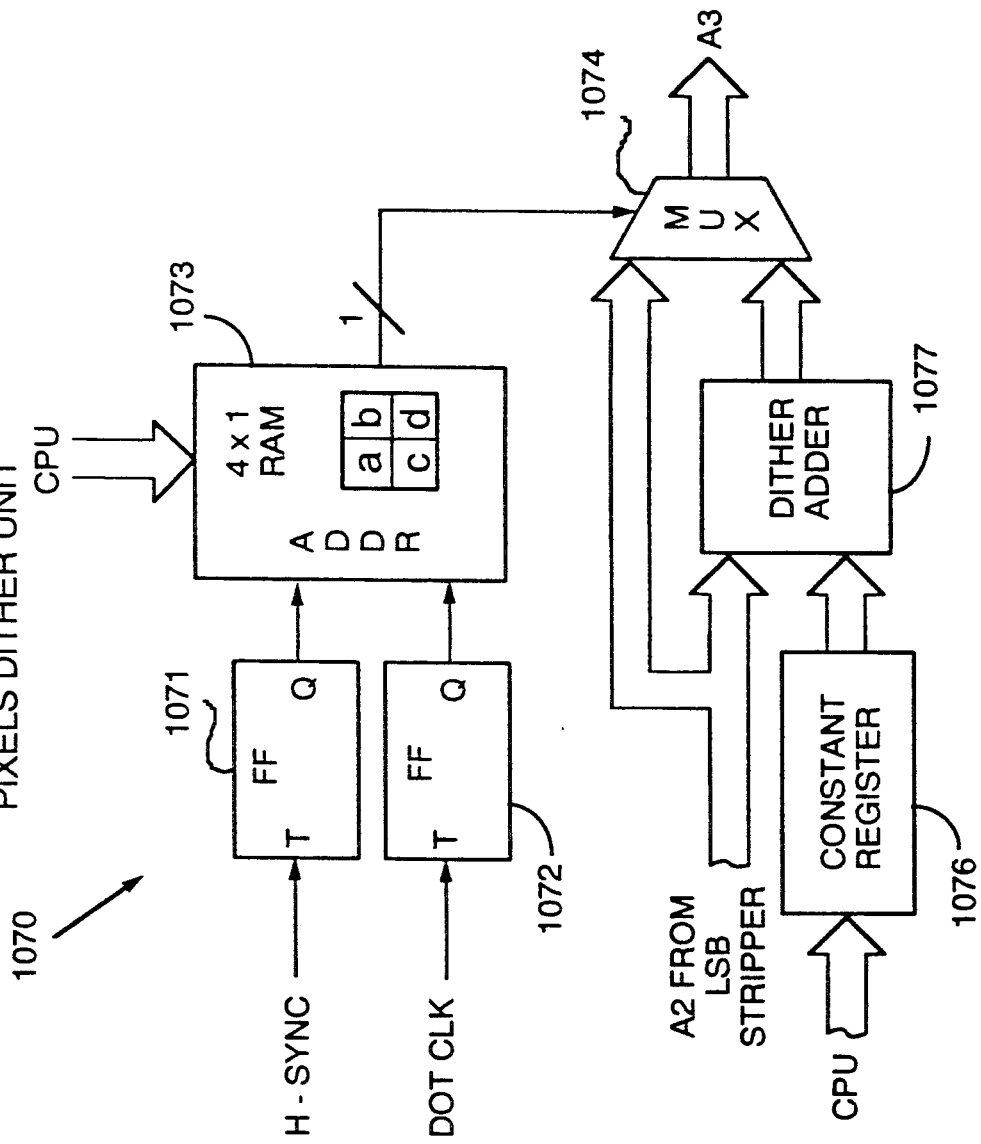

SYSTEM AND METHOD FOR BLINKING DIGITALLY-COMMANDED PIXELS OF A DISPLAY SCREEN TO PRODUCE A PALETTE OF MANY COLORS

CROSS-REFERENCE TO RELATED PATENT APPLICATION

This application is a continuation-in-part of copending U.S. patent application Ser. No. 07/335,622, "Method and Apparatus for Producing Perception of High Quality Grayscale Shading on Digitally Commanded Displays", filed Apr. 10, 1989 by Chester Floyd Bassetti, Jr. et al. The disclosure of said copending application is incorporated herein by reference.

FIELD OF THE INVENTION

The present invention is directed to a system and method for producing the perception of multiple colors and shading on multi-color displays whose pixels are commanded to discrete levels of brightness in a digital fashion. The invention is more specifically directed to a system and method for generating the perception of many different colors and brightness levels by digitally commanding the pixels of a multiplexed or active matrix liquid crystal displays having pixels of different colors to be turned on or off at appropriate times using a frame rate duty cycle technique.

DESCRIPTION OF THE RELEVANT ART

In conventional color television equipment, a cathode ray tube (CRT) is provided with a display face covered, by phosphor dots of three primary colors (e.g., red, green and blue or, in a complementary system, cyan, magenta and yellow). Each phosphor dot is energized by an electron beam whose intensity can be varied continuously from a maximum intensity level to null using a grid electrode of the CRT. By applying an electron beam of different intensity to each of adjoining red, green and blue phosphor dots, it is possible to create the perception of a wide variety of colors and color brightness levels.

In so-called "binary-commanded" flat-panel displays such as multiplexed liquid crystal displays (mx-LCDs), multiplexed light emitting diode (LED) matrices and plasma displays, the individual pixels (discrete regions of light emission, transmission or reflection) of the display are commanded to switch towards only two possible states, ON or OFF. Within the more generic form of "digitally-commanded" flat-panel displays; there are some recently introduced active-matrix liquid crystal displays (am-LCDs) wherein the pixels are commanded to a limited number of discrete brightness levels greater than two (typically 4 or 8 levels of discrete brightness levels).

Normally, flat panel displays are used for producing monochrome images, but recently, color versions of both the 2 level binary-commanded displays and the 4 or 8 level digitally-commanded displays have been introduced. Two-level flat panel displays generally rely on mx-LCD technology while the 4 or 8-level panels generally rely on am-LCD technology. For each single pixel area of a previous monochrome display, three primary-color sub-areas are substituted (e.g., red, green and blue). In binary-commanded displays, each pixel area which contains three such colored sub-areas can be controlled to have the eight static states which arise from the four generic combinations: all OFF, one ON, two ON and three ON. A rather limited number, $2^3$, of colors and limited number (4) of brightness levels are thus produced. For example, if red and green are both turned ON while blue is turned OFF, a first mixed color of a first photometric brightness level is produced. If only red is turned ON, a different color of a reduced photometric brightness level is produced because one rather than two sub-areas is lit. Only one of eight distinct colors (including black) may be produced statically at each pixel area and these produced colors are not necessarily of uniform brightness.

In an 8-level digitally-commanded display, the number of possible static combinations is $8^3$, or 256. This number is rather small when compared to the almost infinite number of fine hues and luminance levels which can be produced on an analog color-CRT.

If only the color producing capabilities of a CRT are compared against those of currently available, colored flat panel displays, then the CRT is found to be clearly superior. But when weight and size are also considered, it is found that conventional color CRTs tend to be substantially larger and heavier. In contrast, digitally controlled flat panel displays such as those employing liquid crystal or similar flat-panel technologies tend to be slim and lightweight. For many applications there is a desire in the industry to substitute the lightweight and slimmer flat panel displays for the bulkier color CRT's of conventional color equipment. Such flat panel color displays, if they could provide substantially the same spectrum of colors and brightness levels as do color CRT's, would be particularly useful in applications where portability is desired, as for example, in laptop or notebook style computers.

SUMMARY OF THE INVENTION

In accordance with a first aspect of the invention, for a digitally-commanded display having a matrix of pixel areas, where each pixel area comprises a plurality of differently colored sub-areas, a large palette of different colors is produced by applying binary pulse streams of variable duty cycle to the color sub-areas of each multicolored pixel area. The perceived brightness level of each sub-area varies according to the duty cycle of its driving signal, and thus, the perception of a mixed color having a distinct shade is created by applying a driving signal of distinct duty cycle to each color subarea of each pixel area. Different levels of color brightness are realized by varying the absolute duty cycles while maintaining a fixed ratio between the duty cycles of the driving signals applied to each color sub-area of a particular pixel area.

According to a further aspect of the invention, a unique phase relation is developed between the driving signals applied to adjacent pixel areas so that the perception of flickering and movie-marquee streaming is minimized.

BRIEF DESCRIPTION OF THE FIGURES

FIG. 2A is a schematic diagram of a first binary-commanded blinking shutter blinking system.

FIG. 2B a schematic diagram of a second binary-commanded shutter blinking system integrated with an n-level analog-commanded display system.

FIG. 3A is a block diagram of a multiplexed, flat panel, color display system in accordance with the invention.

FIG. 3B is a plot explaining the frame rate duty cycle technique for energizing pixels.

FIG. 3C is a plot of Frame Rate Duty Cycle versus Average Photommetric Brightness.

FIG. 4 illustrates a movie marquee effect which tends to be perceived if the phase relationship between adjacent pixels is not properly controlled.

FIG. 5A illustrates a three-by-three phase placeent technique.

FIG. 5B illustrates an abbreviated way of representing the phase placement technique of FIG. 5A.

FIG. 6 illustrates a two-by-two phase placement matrix.

FIG. 9 is a block diagram of an integrated circuit for driving both a multi-color flat panel display and a CRT.

FIG. 11A is a schematic of the CRT Color matching unit shown in FIG. 10A.

FIG. 13 is a schematic of the Pixels Dithering unit shown in FIG. 10A.

DETAILED DESCRIPTION OF THE INVENTION

Figure 1A:
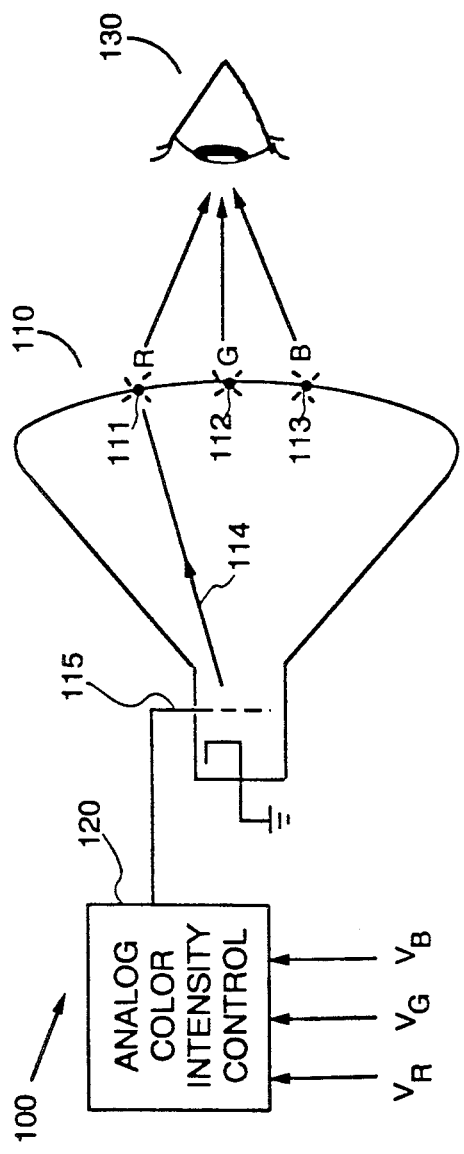
FIG. 1A is a schematic of a conventional color CRT display system.

Referring to FIG. 1A, in a conventional color television system 100, phosphor dots, 111, 112 and 113 of a respective set of three primary colors, red (R), green (G) and blue (B), are provided on the face plate of a cathode ray tube (CRT) 110. Each dot 111-113 is energized by an electron beam 114 which passes through an intensity controlling grid 115 of the CRT 110. A color intensity control circuit 120 applies an analog control voltage to the grid 115 to control the intensity of the electron beam 114, and through such control, modulate the brightness level to which each of the differently colored dots 111-113 (R,G,B) will light up.

When viewing the face plate from a distance, the human eye 130 tends to combine the brightness levels of closely adjacent dots 111-113, merge their colors together, and thus, perceive a distinct mixed color of a specific brightness level. The perception of a wide variety of mixed colors each having different brightness levels may be created by applying analog voltage levels, $V_4$, $V_G$ and $V_B$ to the color intensity control circuit 120 in order to set the individual intensities of adjacent dots 111, 112 and 113.

Figure 1B:
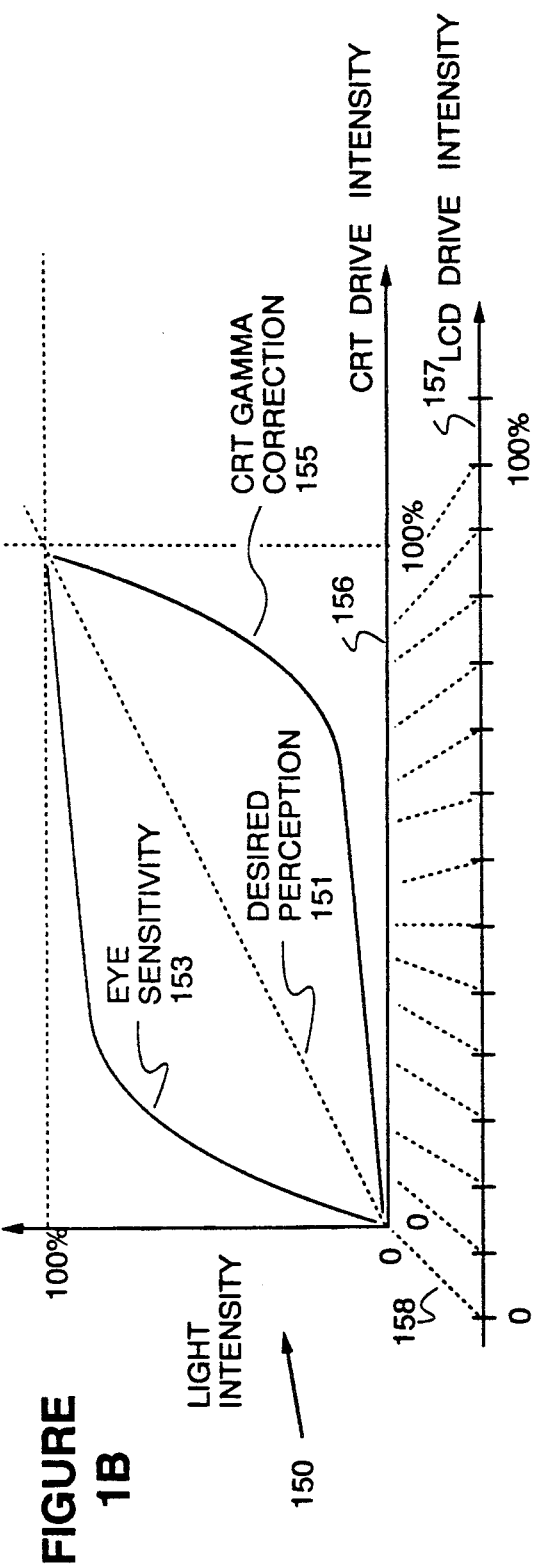
FIG. 1B illustrates a gamma correction plot typically associated with conventional CRT systems and a mapping of the plot to drive a non-CRT display.

Referring to FIG. 1B, the human eye 130 responds non-linearly to linear increments in photometric brightness. If photometric brightness is increased linearly according to line 151, the perceived brightness is according to the exponential eye sensitivity curve 153. To account for this, the control-grid input voltage of the CRT 110 is weighted such that the output-brightness transfer characteristic of the CRT is a reciprocal gamma correction curve 155. The combination of the eye sensitivity curve 153 and CRT gamma correction curve 155 produces a perception of linear increase in brightness for linear increases in an input drive voltage applied to the input of the CRT drive electronics. The relation between the input drive voltage and the voltage developed at the CRT grid element 115 is usually a nonlinear one. But the composite action of the CRT drive electronics, the CRT itself and the human eye is to produce linear relation between input drive voltage and perceived output brightness as indicated by perception line 151. The CRT gamma correction curve 155 is a function of properties inherent to the phosphor dots 111-113 on the CRT face plate and other features of the CRT 110.

Flat panel displays based on liquid crystal technology (LCDs), light emitting diodes (LEDs) or other non-CRT technologies typically have an input drive intensity versus photometric output-brightness curve (transfer function) that is substantially different from that of the CRT transfer function. In some applications it is desirable to substitute a flat panel for a CRT while keeping part or all of the CRT drive electronics. If a flat panel display is to respond as expected to the grid voltage of a CRT drive system, accommodations need to be made for the difference between the output-brightness versus drive intensity curve of the CRT and that of the flat panel display.

Figure 10A:
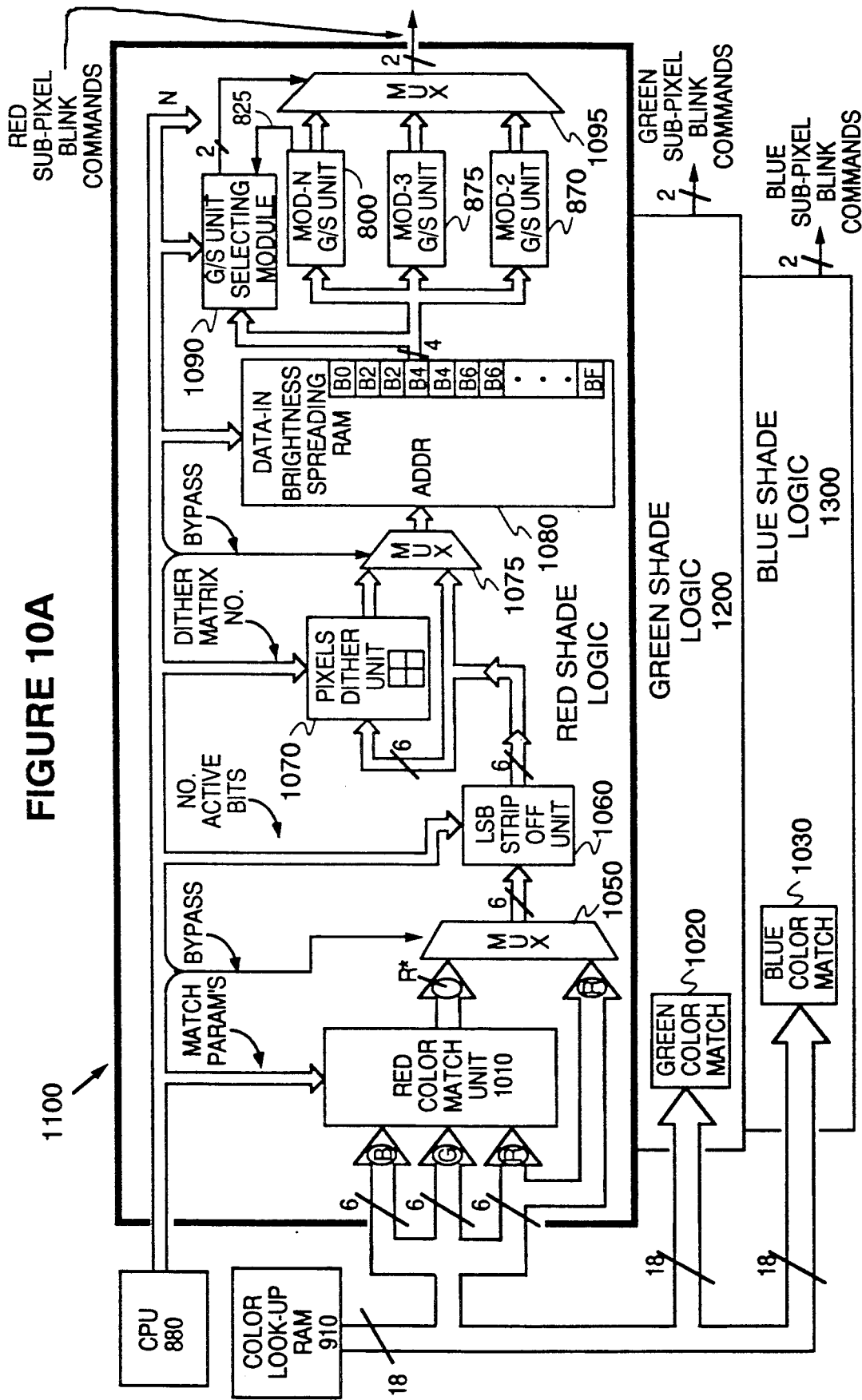
FIG. 10A is a block diagram illustrating the internal structure in one of the three shading units shown in FIG. 9.

In accordance with a first aspect of the invention, a programmable mapping means is provided for canceling out gamma correction portions of a CRT drive signal and adding a substitute flat-panel gamma correction weighing to the CRT drive signal so that the perceived increments of brightness on a given flat panel display will correspond to those on a given CRT display. As seen in FIG. 1B, to convert from points along the CRT input drive spectrum (x-coordinate line) 156 to corresponding points along a LCD drive spectrum 157 requires a mapping function 158 which is not necessarily linear. In one embodiment, the programmable mapping means includes a programmable memory unit for mapping an input brightness level to one of a plurality of brightness output levels that are attainable on a flat panel display (e.g., a LCD). This aspect of the invention will be explained in more detail when a "brightness-spreading" RAM 1080 of FIG. 10A is discussed.

Referring to FIG. 2A, a first binary-commanded shutter blinking system 200 in accordance with the invention is illustrated. In this shutter system 200, a relatively thin first optical layer having an array 210 of binary-commanded shutter elements, 211, 212 and 213, is placed over a similarly thin, second optical layer having an array 215 of color filter elements for generating three primary colors, R, G and B. A white light source 216 passes rays of lights through the color filter array 215. Each shutter element, 211-213, of the shutter array 210 is commanded towards either a light-transmitting state or a light-blocking state by an electrical drive signal applied to the shutter element. Light passing through the shutter array 210 is received by a human eye 130 and merged therein to create the perception of mixed colors.

Since under static conditions, each shutter element 211-213 can be either open or closed (transmitting or blocking), only eight possible states can occur if the electric drive signals are static. These limited number of states range from all shutter elements 211-213 being simultaneously closed, to only one being opened, two being opened at a time, or all three being open. The perceived color combinations and brightness levels are thus limited to those created by the eight static shutter states. According to the invention, however, the shutter elements 210 are blinked open and shut at a rapid rate (e.g., 30 times per second or faster) to create the perception of intermediate levels of brightness.

In one embodiment, the shutter elements 211-213 are liquid crystal shutters whose light-transmitting or light-blocking states are controlled by electrical drive signals supplied from respective electrical switches $SW_R$, $SW'_G$ and $SW'_B$. The states of these switches, $SW'_R$, $SW'_G$ and $SW'_B$, are in turn controlled by a digital shutter control circuit 220 which sets each switch, $SW_R$, $SW'_G$ AND $SW'_B$, to output one of two voltage levels (+V or GND). The digital shutter control circuit 220 receives respective single-bit command signals, $B_R$, $B_G$ and $B_B$, from an external to control the individual states of the respective shutter elements 211, 212 and 213.

The human eye 130 has a tendency to integrate light over time as well as space. Thus, if the control switches $SW'_R$, $SW'_G$ and $SW'_B$ are rapidly switched open and closed a plurality of times between the opposed voltage levels (+V and GND), over a short span of time (e.g. less than one second), the shutter elements 211-213 will blink rapidly and a perception of different brightness levels will be created as the switching-rate is changed. Individual brightness levels will be attributed to each of the three light rays emanating from the respective shutter elements 211-213 according to the individual blinking rate of the corresponding shutter element but these distinct brightness levels will be merged by the eye 130 to create the perception of a mixed color having a single mixed brightness level. By varying the open and close switching rate of each shutter element 211-213 individually, a wide variety of mixed colors and mixed brightness levels can be perceived. The mixed color is a function of the ratios formed by the blinking rates of the shutter elements while the mixed brightness level is further a function of the absolute values of the blinking rates.

Referring to FIG. 2B, an n-level digitally-commanded system 250 is illustrated. Like reference numbers are applied to elements of FIG. 2B which correspond to those of FIG. 2A. Shutter layer 210 and brightness selecting layer 230 are really one and the same but they are conceptually separated in FIG. 2B for simplifying the explanation. Pixel sub-area 211 and pixel sub-area 231 represent distinguishable functions of a single sub-area 211/231. They are schematically separated to indicate that there is a binary ON and OFF function 21 attributed to the physical pixel sub-area 211/231 as well as a function 231 for selecting discrete levels of light transmission between the ON and OFF states. It has been found that certain voltage levels applied to some types of liquid crystal elements result in discrete levels of light transmission between 0% and 100%. The intermediate brightness levels of pixel sub-function 231 are selected by an analog level control circuit 240 which receives digital control bits $B'_R$, $B'_G$ and $B'_B$. Pixel sub-function 231 is illustrated by way of example to have four levels of light transmission (e.g., 25%, 37%, 50%, 67%) between the completely ON (100%) and completely OFF (0%) states. Thus, for this example, one of six discrete brightness levels (0%, 25%, 37%, 50%, 67% and 100%) will be attainable by the light emanating from the one pixel sub-area 211/231.

Different flat panel technologies produced by different manufacturers are capable of producing a different number of discrete brightness levels. Some can produce only two levels of brightness (ON and OFF), some can produce four levels of brightness (0%, 33%, 66%, 100%) and some can produce as many as eight levels of brightness (not necessarily uniformly distributed between 0% and 100%). What is common to all these flat panels, irrespective of their number of intermediate brightness levels, is that they all have the ON/OFF sub-function 211. What is needed, is an approach which can deal uniformly with all the different kinds of flat panel technologies. This is the reason that the ON/OFF shutter sub-function layer 210 is shown separated from the intermediate-brightness sub-function layer 230 in FIG. 2B.

In accordance with the invention, a frame rate duty cycle technique (FRDC) is applied to rapidly and repeatedly blink open and shut the shutter elements of each color plane independently of the intermediate brightness level that is statically selected by the intermediate brightness function 230, if any. A simple AND gate circuit may be used to command all drive bits to zero for each sub-pixel in an n-level display in order to blink the pixel closed. For each level of static brightness, the rapid blinking causes the human eye 130 to perceive finer levels of brightness in each of the produced colors, R, G and B. The same digital shutter control circuit 220 used for binary-commanded panels is used for all n-level panels irrespective of whether they are four-level, eight-level or higher in terms of their brightness selection capabilities. For each static combination of full or intermediate brightness, further subtleties in gray scale capability are realized by using the blinking technique of the invention to provide more color mixtures and brightness levels than previously possible.

The respective shutter systems 200 and 250 of FIGS. 2A and 2B are of rather limited utility if they only have three shutter elements. Referring to FIG. 3A, in a practical application it is desirable to have a large matrix of color-producing areas so that high definition images may be created. FIG. 3A shows a schematic front view of a display system 300 in which different color-producing sub-areas, 311 (R), 312 (G) and 313 (B), are placed close to one another to define a first pixel area $Px_{11}$ in a flat panel screen area 310. The same pattern of color-producing sub-areas is repeated in a horizontally adjacent pixel area $Px_{12}$, then again in a next horizontally adjacent pixel area $Px_{13}$, and so on, to define a horizontal row of colored pixel areas, $PX_{11}, PX_{12}, PX_{13}, \ldots, PX_{1N}$. The pattern is repeated vertically so that a vertically adjacent row contains pixels $Px_{21}, Px_{22}, Px_{23}, \ldots, Px_{2N}$. A large number of rows and columns (e.g., 480 by 720) is typically defined on the face of the display panel 310. For the sake of brevity, multi-colored pixel areas will be referred to here simply as pixels, single-colored pixel sub-areas will be referred to as sub-pixels and an NxM matrix of pixel areas, where both N and M are much greater than one, will be referred to as a screen area.

The display system 300 of FIG. 3A is multiplexed. A gridwork of vertical wires 321, 322, 323, etc. and horizontal Wires 331, 332, 333, etc. cross at the color-producing sub-areas 311, 312, 313, etc. of flat panel 310 in order to selectively energize each of the color-producing sub-areas (once during each of a series of frame periods) towards at least one of the ON (100%) and OFF (0%) states. A dot clock signal 301 produced from a system clock generating unit 302 (also referred to as a Dot-clock generator) is applied to a column counter 303 (also referred to as a Dot-counter), a row counter 304, a frame counter 305 and a digital shutter control unit 320. The latter unit 320 is also referred to here as a duty cycle and phase selector 320 (DCAPS for short). The output lines of column counter 303 and row counter 304 are coupled to the address input terminals of a random access memory (color RAM) 306. The data contents of the color RAM 306 are pre-set by a central processing unit (CPU) 307 whose data bus is coupled to a data input port of the color RAM 306.

For each row number, RW, and column number, CO, generated by respective row counter 304 and column counter 303, the color RAM 306 produces a set of intensity numbers corresponding to the desired intensities of the R, G and B sub-pixels in the addressed pixel area ($PX_{RW,CO}$).

In each unique display system (i.e. EGA, CGA or VGA as defined by IBM Corp. of New York), a predefined number of horizontally adjacent dots constitutes a horizontal row and a predefined number of vertically adjacent rows constitutes a frame. Frames are repeated approximately 50 times or more a second depending on an image persistence character of the human eye 130. In the illustrated system 300, the current frame number, row number, column number, intensity numbers and dot clock 301 are all fed to the duty cycle and phase selector (DCAPS) 320. The DCAPS 320 designates each group of N sequential frames as a frames repetition group ("FRG" for short), where N is an integer greater than one. For each frame in a frames repetition group (FRG), the DCAPS 320 decides if a particular sub-pixel should be commanded towards the ON state or OFF state. The number of times, b, that a particular subpixel (e.g. 313) is commanded towards the ON state during a group of N sequential frames (an FRG) defines the frame rate duty cycle of that sub-pixel (FRDC=b/N). For simplicity, the frame rate duty cycle assigned to each sub-pixel may also be spoken of in terms of the number of ON command bits (the number b) that it receives within a frames repetition group (FRG). The number b may also be referenced as the "brightness" level of that sub-pixel.

For any given number, b, of ON command bits where b is greater than one but less than N, there will be a variety of ways in which the ON bits and opposing OFF bits may be distributed through the duration of the frames repetition group (FRG).

Referring to FIG. 3B, there are illustrated four synchronous plots respectively showing the value, Modulo-N (Frame Number), and three brightness-setting waveforms respectively denoted as $B(\frac{1}{3})P(0)$, $B(\frac{1}{3})P(1)$, and $B(\frac{1}{3})P(2)$, each plotted against time. Each waveform has a plurality of short duration pulses 340 and an FRDC of $\frac{1}{3}$ attributed to it but a different "phase number", P(x), where x=0, 1, 2.

Referring to the plot FIG. 3C, each waveform of waveforms $B(\frac{1}{3})P(0)$, $B(\frac{1}{3})P(1)$, and $B(\frac{1}{3})P(2)$ will produce the same average photometric brightness, xx%, as a result of its energizing pulses 340, but there is a spatial and chronological interrelation between adjacent pixel areas that should be considered if acceptable images are to be produced.

Referring to FIG. 4, if the short-duration energizing pulses 340 of FIG. 3B are applied to all the color-producing subpixels in a large screen area 310 almost simultaneously (all in the same frame) and at a rate of approximately one pulse every 30th of a second or slower, the entire screen area 310 will appear to flicker ON and OFF at that rate as the persistence of each refresh dies off. If, on the other hand, the energizing pulses 340 are spread over space and time so as to be interlaced over a plurality of rows, columns and frames, the flickering will subside. However, a movie marquee effect may be perceived if the distribution is not properly chosen. The movie marquee effect is one where dots appear to stream in a particular direction across the display screen. Both the flickering and movie marquee effects are undesirable.

In the example of FIG. 4, the first phased waveform $B(\frac{1}{3})P(0)$ is applied to energize all sub-pixels of column numbers 1, 4, 7, etc. within screen area 310. The second waveform $B(\frac{1}{3})P(1)$ is applied to energize all sub-pixels within columns 2, 5, 8, etc. The third waveform $B(\frac{1}{3})P(2)$ is applied to energize all sub-pixels within columns 3, 6, 9, etc. During the display of Frame 0, the image is as indicated at 400, with columns 1, 4, 7, etc. being lit up. During Frame 1, the image is as indicated at 400', with columns 2, 5, 8, etc. being lit up. During Frame 2, the image is as indicated at 400'', with columns 3, 6, 9, etc. being lit up. The image for Frame 3 is 400. The image for Frame 4 is 400' and so on. This pattern repeats forever. A left to right movement of lit up areas is perceived across the screen if the rate is less than a persistence characteristic of the human eye 130. The movement is seen because of the asymmetrical positioning of lit up pixels over time. Once the movie marquee effect is perceived, it can become quite annoying.

A three-by-one repetition matrix $M_{3\times1}$ is denoted at the bottom of image 400''. Display images 400, 400' and 400'' are all built out of this basic three-by-one matrix $M_{3\times1}$ whose geometry is asymmetric. In image 400, the left pixel of matrix $M_{3\times1}$ is lit. In image 400', the middle pixel is lit. And in image 400'', the right pixel is lit.

The above-cited copending application of Bassetti explains how to minimize the movie marquee effect in multiplexed monochrome LCD flat panel displays by using a symmetric, square matrix, preferably of a seventeen-by-seventeen configuration. One question presented here is how to minimize flickering and streaming in multi-color displays where the display technology could be either multiplexed or active matrix. Active matrix displays have one or more transistors integrally fabricated adjacent to each pixel area. The response time of active matrix displays to ON/OFF commands tends to be substantially shorter than that of multiplexed displays. As a consequence, the refresh rate of energizing pulses has to be substantially higher. A frames repetition group size, N, of less than 17 may be needed to avoid noticeable flicker.

According to the present invention, N is made programmable. For high speed displays which require values of N less than 17, each pixel is assigned an individual value of N and this individual N can vary in the range 2 to 17. In one embodiment, 2×2 matrix operations, are intermixed with 3×3 and/or 17×17 operations.

Another problem is how to treat the differently colored but adjacent sub-pixels of the display. It was discovered that each hypothetical color plane not only could, but should, be treated as if it were a separate monochrome screen. The phasing of signals to each hypothetical color plane screen should be the same. The reasons for this are multifold. First, if all the pixels of a screen area are commanded to display only one pure color, e.g. red, then the problem of flicker and movie marquee avoidance reduces to the monochrome problem. If all the pixels of a relatively large screen area are commanded to a single mixed color (e.g. R and G both ON while B is OFF), then the active color planes can be hypothetically merged together if the phases of their driving signals are the same, and again the problem reduces to the monochrome situation. A further reason is that the size, cost and complexity of the control circuit is minimized by treating each color plane as a separate screen. Through simulation, it was discovered that the human eye tends to treat the movie marquee effect on this color-plane by color-plane basis, looking for a streaming effect first in each color plane before merging the colors to produce a perceived pixel of mixed color.

Referring to FIGS. 5A, 5B, 6, 7A and 7B; it was discovered that at least two or three different phase placement patterns should be made available for avoiding the perception of streaming in high-speed active matrix displays and low-speed multiplexed displays. The three patterns are the square matrices of respective dimensions $2 \times 2$, $3 \times 3$ and $17 \times 17$.

Referring first to FIG. 5A, consider the case of a large screen area which is to be operated with a frame rate duty cycle (FRDC) of $\frac{1}{3}$. The screen area is divided into hypothetical square areas each of dimensions three-pixels by three-pixels. One such square area is highlighted as $M_{3,3}$ within FIG. 5A. It should be remembered that the entire screen area is tiled by $M_{3,3}$ areas placed directly adjacent to one another and that each $M_{3,3}$ area is energized in substantially the same manner as its surrounding square areas during each frame. This factor is indicated in FIG. 5A by the dotted square matrix adjacent to the solid line square matrix $M_{3,3}$.

The number of ON pixels (of one hypothetical color plane) are preferably distributed evenly across the surface of each $M_{3,3}$ tile and across the duration of the frames repetition group (FRG) to avoid flickering and movie marquee effects. Thus, in Frame 0, the three pixel areas of (row, column) coordinates, (1,2), (1,3) and (2,1) are lit up. In Frame 1, pixel areas (1,1), (2,2) and (3,3) are lit up. In Frame 2, pixel areas (2,3), (3,1) and (3,2) are lit up. This pattern is then repeated frame after frame.

Referring to FIG. 5B, a short hand method for representing the three frame pattern of FIG. 5A is shown. Each box in the $M_{3 \times 3}$ matrix is filled with the phase number, P0, P1 and P2 corresponding to the $B(\frac{1}{3})$ signal which drives that pixel area.

Referring to FIG. 6, the short hand notation for a two-by-two phase placement matrix $M_{2 \times 2}$ is shown.

Figure 7A:
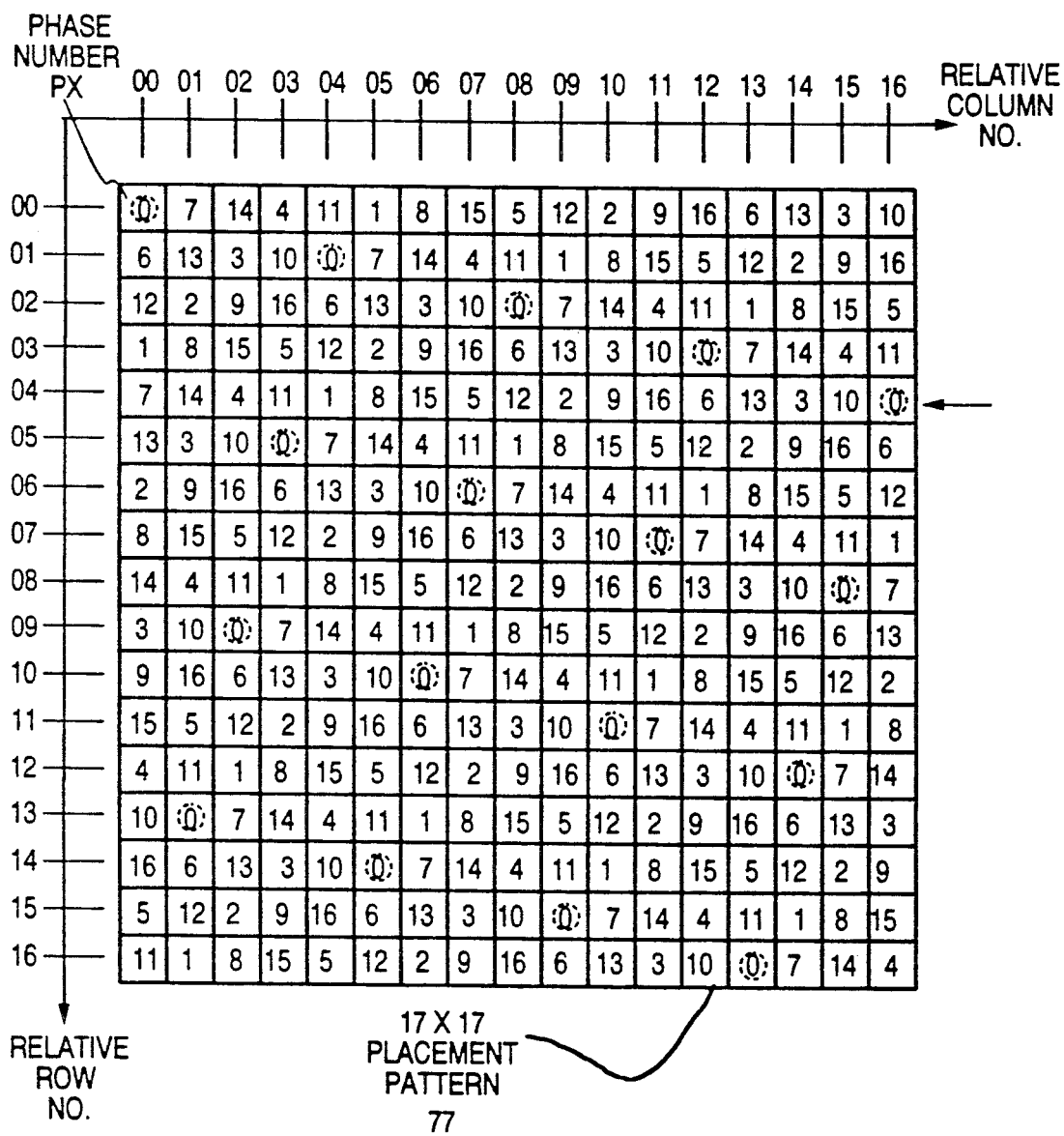
FIGS. 7A and 7B respectively illustrate first and second 17×17 phase placement matrices.
Figure 7B:
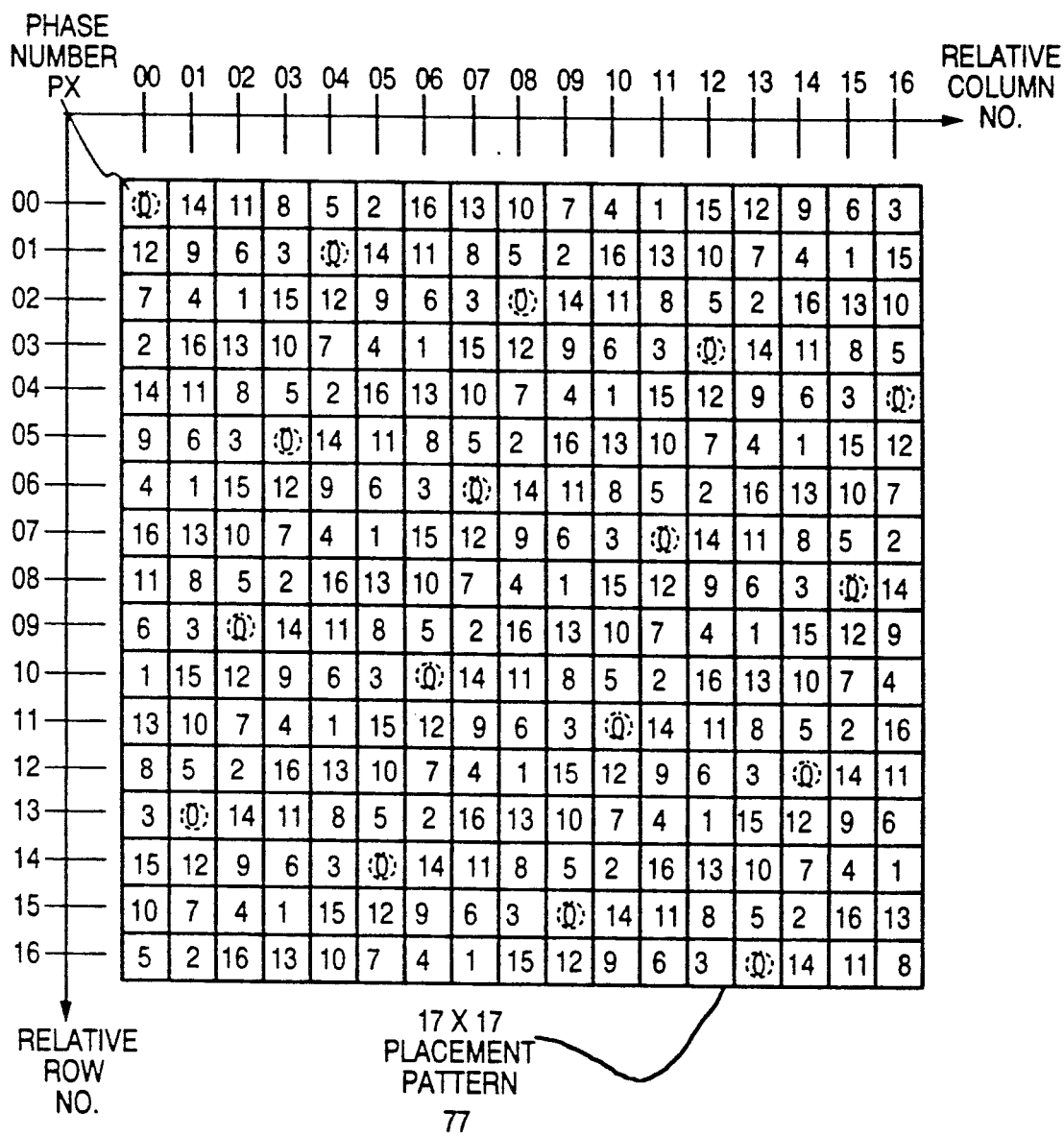

Referring to FIGS. 7A and 7B, two different phase placement patterns, 700 and 750, for a seventeen-by-seventeen arrangement are shown. The phase numbers represent the phases of a 1/17 brightness waveform, B(1/17) (not shown). For brightness waveforms having a frames group size, N, that is smaller than 17, a Modulo-N operation is applied to the phase numbers to obtain an appropriate phase number for such waveforms. The rows of the matrix 700 shown in FIG. 7A are constructed from the wraparound array 710 shown below it (0, 7, 14, 4, ...). The rows of the second matrix 750 shown in FIG. 7B are constructed from the wraparound array 760 shown below it (0, 14, 11, 8, ...). It was found by experimentation that the first matrix 700 is preferred when a current pixel has a brightness level different from a previous pixel while the second matrix 750 is preferred when the current pixel is to be driven to a brightness level the same as that of the previous pixel. In both $17 \times 17$ matrices, a "knight's move" of one row down and four columns to the right separates one phase P(x) pixel from another pixel of the same phase P(x).

Figure 8A:
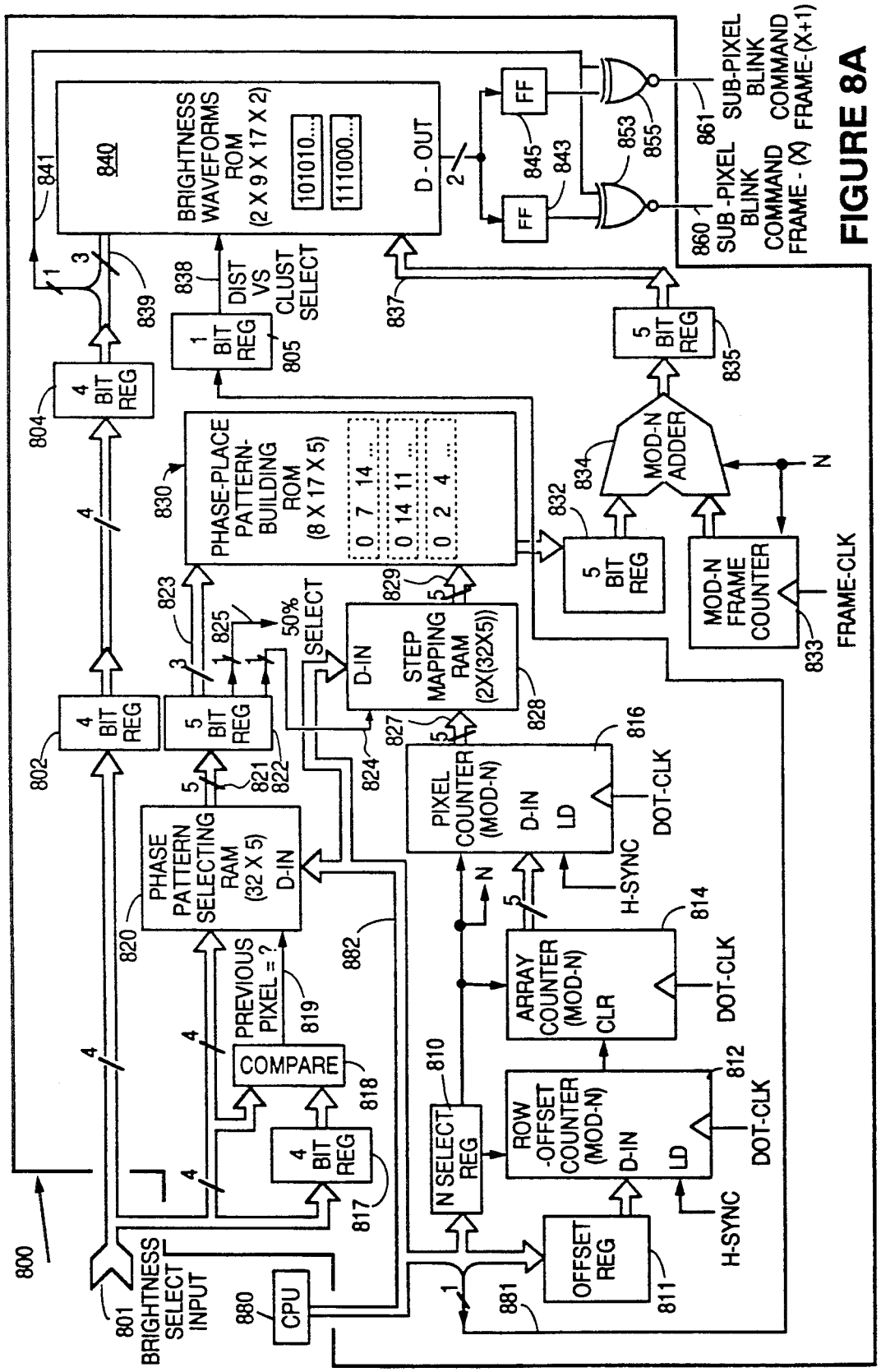
FIG. 8A is a block diagram of a Modulo-N gray scaling circuit.

Referring to FIG. 8A, a schematic of a flexible Modulo-N gray scaling circuit 800 is shown. Key elements in this Mod-N G/S unit 800 are a modulo-N selecting register 810, a phase pattern selecting memory 820, a phase pattern building memory 830 and a brightness waveforms storing memory 840.

A four-bit wide brightness selecting signal is applied to input bus 801 of the Mod-N G/S unit 800. The brightness level is pipelined through a plurality of four-bit wide registers, 802 and 804 to synchronize it with other time delayed signals flowing through the G/S unit 800. A three-bit wide, less significant portion, of the brightness-selecting signal is applied to three address-input terminals 839 of the brightness waveforms storing memory 840. Memory 840 is preferably a high-speed read only memory (ROM) unit having at least 612 memory cells organized as $2 \times (9 \times 17) \times 2$ bits.

Four sets of waveform words are stored within this waveforms ROM 840. Each set has nine 17-bit long words. The sets are paired so that in each pair the words are identical except for a one bit rotation. This allows the ROM 840 to output not only an energizing command for a sub-pixel in a first frame but also the command for the same sub-pixel in a following frame. The next-frame command is optionally stored in a frame-acceleration memory (962 of FIG. 9) which is read in an interlaced fashion with a current frame memory so that high speed refresh is made possible.

A first waveforms set (within a first waveforms pair) contains nine so-called "distributed" waveform words wherein the number of logic one (1) bits in each word are uniformly distributed across its 17 bits. A second waveforms set (in a second waveforms pair) contains nine so-called "clustered" waveform words wherein the number of logic ones (1) in each word are clustered towards the left side of its 17 bits. The patterns of logic ones (1) and zeroes (0) in the distributed and clustered waveform words are set forth in the following Tables I and II. The logic ones are highlighted by underlining.

TABLE I

| NAME | DISTRIBUTED WAVEFORM WORDS PATTERN OF ONES AND ZEROES | | | | | | | | | | | | | | | | |
|---|---|---|---|---|---|---|---|---|---|---|---|---|---|---|---|---|---|
| Dist Wave 0/17: | 0 | 0 | 0 | 0 | 0 | 0 | 0 | 0 | 0 | 0 | 0 | 0 | 0 | 0 | 0 | 0 | 0 |
| Dist Wave 1/17: | <u>1</u> | 0 | 0 | 0 | 0 | 0 | 0 | 0 | 0 | 0 | 0 | 0 | 0 | 0 | 0 | 0 | 0 |
| Dist Wave 2/17: | <u>1</u> | 0 | 0 | 0 | 0 | 0 | 0 | 0 | <u>1</u> | 0 | 0 | 0 | 0 | 0 | 0 | 0 | 0 |

TABLE I-continued

| NAME | DISTRIBUTED WAVEFORM WORDS PATTERN OF ONES AND ZEROES | | | | | | | | | | | | | | | | |
|---|---|---|---|---|---|---|---|---|---|---|---|---|---|---|---|---|---|
| Dist Wave 3/17: | 1 | 0 | 0 | 0 | 0 | 0 | 1 | 0 | 0 | 0 | 0 | 0 | 1 | 0 | 0 | 0 | 0 |
| Dist Wave 4/17: | 1 | 0 | 0 | 0 | 1 | 0 | 0 | 0 | 1 | 0 | 0 | 0 | 1 | 0 | 0 | 0 | 0 |
| Dist Wave 5/17: | 1 | 0 | 0 | 1 | 0 | 0 | 0 | 1 | 0 | 0 | 1 | 0 | 0 | 0 | 1 | 0 | 0 |
| Dist Wave 6/17: | 1 | 0 | 0 | 1 | 0 | 0 | 1 | 0 | 0 | 1 | 0 | 0 | 1 | 0 | 0 | 1 | 0 |
| Dist Wave 7/17: | 1 | 0 | 0 | 1 | 0 | 1 | 0 | 0 | 1 | 0 | 0 | 1 | 0 | 1 | 0 | 1 | 0 |
| Dist Wave 8/17: | 0 | 1 | 0 | 1 | 0 | 1 | 0 | 1 | 0 | 1 | 0 | 1 | 0 | 1 | 0 | 1 | 0 |

TABLE II

| NAME | CLUSTERED WAVEFORM WORDS PATTERN OF ONES AND ZEROES | | | | | | | | | | | | | | | | |
|---|---|---|---|---|---|---|---|---|---|---|---|---|---|---|---|---|---|
| Clust Wave 0/17: | 0 | 0 | 0 | 0 | 0 | 0 | 0 | 0 | 0 | 0 | 0 | 0 | 0 | 0 | 0 | 0 | 0 |
| Clust Wave 1/17: | 1 | 0 | 0 | 0 | 0 | 0 | 0 | 0 | 0 | 0 | 0 | 0 | 0 | 0 | 0 | 0 | 0 |
| Clust Wave 2/17: | 1 | 1 | 0 | 0 | 0 | 0 | 0 | 0 | 0 | 0 | 0 | 0 | 0 | 0 | 0 | 0 | 0 |
| Clust Wave 3/17: | 1 | 1 | 1 | 0 | 0 | 0 | 0 | 0 | 0 | 0 | 0 | 0 | 0 | 0 | 0 | 0 | 0 |
| Clust Wave 4/17: | 1 | 1 | 1 | 1 | 0 | 0 | 0 | 0 | 0 | 0 | 0 | 0 | 0 | 0 | 0 | 0 | 0 |
| Clust Wave 5/17: | 1 | 1 | 1 | 1 | 1 | 0 | 0 | 0 | 0 | 0 | 0 | 0 | 0 | 0 | 0 | 0 | 0 |
| Clust Wave 6/17: | 1 | 1 | 1 | 1 | 1 | 1 | 0 | 0 | 0 | 0 | 0 | 0 | 0 | 0 | 0 | 0 | 0 |
| Clust Wave 7/17: | 1 | 1 | 1 | 1 | 1 | 1 | 1 | 0 | 0 | 0 | 0 | 0 | 0 | 0 | 0 | 0 | 0 |
| Clust Wave 8/17: | 1 | 1 | 1 | 1 | 1 | 1 | 1 | 1 | 0 | 0 | 0 | 0 | 0 | 0 | 0 | 0 | 0 |

The bits of each of the above waveform words may be selectively inverted using a bank of exclusive OR gates (853 and 855) to generate additional, derived waveforms as shown for example in Table III below. This time logic zeroes are underlined for emphasis.

TABLE III

| NAME | ADDITIONAL DISTRIBUTED WAVEFORMS DERIVED FROM STORED WAVEFORMS PATTERN OF ONES AND ZEROES | | | | | | | | | | | | | | | | | |
|---|---|---|---|---|---|---|---|---|---|---|---|---|---|---|---|---|---|---|
| Dist Wave 9/17: | 1 | 0 | 1 | 0 | 1 | 0 | 1 | 0 | 1 | 0 | 1 | 0 | 1 | 0 | 1 | 0 | 1 | = 8/17 inverted |
| Dist Wave 10/17: | 0 | 1 | 1 | 0 | 1 | 0 | 1 | 1 | 0 | 1 | 1 | 0 | 1 | 0 | 1 | 0 | 1 | = 7/17 inverted |
| Dist Wave 11/17: | 0 | 1 | 1 | 0 | 1 | 1 | 0 | 1 | 1 | 0 | 1 | 1 | 0 | 1 | 1 | 0 | 1 | = 6/17 inverted |
| Dist Wave 12/17: | 0 | 1 | 1 | 0 | 1 | 1 | 1 | 0 | 1 | 1 | 0 | 1 | 1 | 1 | 0 | 1 | 1 | = 5/17 inverted |
| Dist Wave 13/17: | 0 | 1 | 1 | 1 | 0 | 1 | 1 | 1 | 0 | 1 | 1 | 1 | 0 | 1 | 1 | 1 | 1 | = 4/17 inverted |
| Dist Wave 14/17: | 0 | 1 | 1 | 1 | 1 | 1 | 0 | 1 | 1 | 1 | 1 | 1 | 0 | 1 | 1 | 1 | 1 | = 3/17 inverted |
| Dist Wave 15/17: | 0 | 1 | 1 | 1 | 1 | 1 | 1 | 1 | 0 | 1 | 1 | 1 | 1 | 1 | 1 | 1 | 1 | = 2/17 inverted |
| Dist Wave 16/17: | 0 | 1 | 1 | 1 | 1 | 1 | 1 | 1 | 1 | 1 | 1 | 1 | 1 | 1 | 1 | 1 | 1 | = 1/17 inverted |
| Dist Wave 17/17: | 1 | 1 | 1 | 1 | 1 | 1 | 1 | 1 | 1 | 1 | 1 | 1 | 1 | 1 | 1 | 1 | 1 | = 0/17 inverted |

An advantage found in all the clustered waveform words and some distributed waveform words is that the right hand portion of each word may be truncated to produce brightness-generating waveforms that are useful for shading matrices smaller than 17×17. The following Table IV shows the respective matrix size, available number of gray shades and clustered waveform word numbers that are used. An asterisk after a waveform number indicates that it is an inverted version of the stored waveform word.

TABLE IV

| N × N MATRIX SIZE | MAX. NUMBER OF SHADES POSSIBLE | LEFT N BITS OF FOLLOWING CLUSTERED WAVEFORM WORDS ARE USED |
|---|---|---|
| 1 × 1 | 2 | 0,0* |
| 2 × 2 | 3 | 0,1,0* |
| 3 × 3 | 4 | 0,1,1*,0* |
| 4 × 4 | 5 | 0,1,2,1*,0* |
| 5 × 5 | 6 | 0,1,2,2*,1*,0* |
| 6 × 6 | 7 | 0,1,2,3,2*,1*,0* |
| 7 × 7 | 8 | 0,1,2,3,3*,2*,1*,0* |
| 8 × 8 | 9 | 0,1,2,3,4,3*,2*,1*,0* |
| 9 × 9 | 10 | 1,1,2,3,4,4*,3*,2*,1*,0* |
| 10 × 10 | 11 | 0,1,2,3,4,5,4*,3*,2*,1*,0* |
| 11 × 11 | 12 | 0,1,2,3,4,5,5*, 4*,3*,2*,1*,0* |
| 12 × 12 | 13 | 0,1,2,3,4,5,6,5*,4*,3*,2*,1*,0* |
| 13 × 13 | 14 | 0,1,2,3,4,5,6,6*,5*,4*,3*,2*,1*,0* |
| 14 × 14 | 15 | 0,1,2,3,4,5,6,7,6*,5*,4*,3*,2*,1*,0* |
| 15 × 15 | 16 | 0,1,2,3,4,5,6,7,7*,6*,5*,4*,3*,2*,1*,0* |
| 16 × 16 | 17 | 0,1,2,3,4,5,6,7,8,7*,6*,5*,4*,3*,2*,1*,0* |
| 17 × 17 | 18 | 0,1,2,3,4,5,6,7,8,8*,7*,6*,5*,4*,3*,2*,1*,0* |

In the modulo-N G/S unit 800 of FIG. 8A, the waveform inversion function is provided by a single-bit wide line 841 that is coupled form the output of four bit register 804 to first input terminals of respective exclusive-OR gates 853 and 855. When this single line 841 is at a logic high, the waveform output levels (for frame x and frame x+1) that emanate from the D-out terminal of waveforms ROM 840 are inverted as they pass through XOR gates 853 and 855. When line 841 is at logic low, the output waveforms of ROM 840 appear in uninverted form at the pixel blink output command lines. 860 and 861 of unit 800.

The selection between distributed and clustered waveforms is made by a data bit stored in a single bit register 805 which is coupled to an address input terminal 838 of the waveforms ROM 840. An external CPU 880 loads this selection bit into the one bit register 805.

The phase of each brightness waveform that is output from the waveforms ROM 840 is selected by a five-bit wide word placed on address input port 837 of the waveforms ROM 840. For each row and column of a flat panel display, the phase selecting number placed on input port 837 corresponds to the phase number within a hypothetical phase placement matrix. The hypothetical phase placement matrix may be any one of the $M_{3 \times 3}$, $M_{2 \times 2}$, or $M_{17 \times 17}$ matrices of FIGS. 5A-7B or another phase placement matrix which is found to be useful for a particular flat panel display.

The hypothetical phase placement matrix is constructed out of phase-placement pattern-building arrays stored in memory unit 830. Memory unit 830 is preferably a high-speed read only memory (ROM) whose internal data is organized as $8 \times 17 \times 5$ bits. The eight wraparound arrays stored within the phase-placement pattern-building ROM 830 each contain 17 words where each word is 5 bits long and the stored arrays are preferably selected from the following Table V.

ways in which the wraparound rows of ROM 840 are stepped through.

The numbers from a selected wraparound array in ROM 830 are added as an offset to the current frame number in order t develop the phase value at input port 837 of the brightness waveforms ROM 840. A five-bit register 832 pipelines the output signal of pattern-building ROM 830 to synchronize the output with the system clock and applies this synchronized signal to a modulo-N adder 834. The other input terminal of the modulo-N adder 834 receives a modulo-N count from a frame counter 833 which is clocked by the display frame clock. A modulo-N operation is performed on the sum of the input values and this operated-on sum is then temporarily stored in a further pipelining five-bit register 835 for synchronization before being applied to address input port 837 of the brightness waveforms ROM 840.

The value N in the modulo-N operations is stored in a N-selecting register 810 which is loaded from the data bus 882 of CPU 880. The CPU 880 also stores a "knight's move" value in an offset register 811. A value of $17-4=13$ generates the one down and four over knight's move previously mentioned for a $17 \times 17$ matrix. The stored offset value of register 811 is loaded into a row offset counter 812 at the beginning of each horizontal row of pixels (signalled by the H-sync clock) and this counter 812 is clocked by the system dot-clock. Upon overflow, the row-offset counter 812 resets a wraparound array counter 814 which is clocked by the

TABLE V

| | STORED | | | | | | | | | | | | | | | | |
|---|---|---|---|---|---|---|---|---|---|---|---|---|---|---|---|---|---|
| PAT0 | 0 | 0 | 0 | 0 | 0 | 0 | 0 | 0 | 0 | 0 | 0 | 0 | 0 | 0 | 0 | 0 | 0 |
| PAT1 | 0 | 1 | 2 | 3 | 4 | 5 | 6 | 7 | 8 | 9 | 10 | 11 | 12 | 13 | 14 | 15 | 16 |
| PAT2 | 0 | 2 | 4 | 6 | 8 | 10 | 12 | 14 | 16 | 1 | 3 | 5 | 7 | 9 | 11 | 13 | 15 |
| PAT3 | 0 | 3 | 6 | 9 | 12 | 15 | 1 | 4 | 7 | 10 | 13 | 16 | 2 | 5 | 8 | 11 | 14 |
| PAT4 | 0 | 4 | 8 | 12 | 16 | 3 | 7 | 11 | 15 | 2 | 6 | 10 | 14 | 1 | 5 | 9 | 13 |
| PAT5 | 0 | 5 | 10 | 15 | 3 | 8 | 13 | 1 | 6 | 11 | 16 | 4 | 9 | 14 | 2 | 7 | 12 |
| PAT6 | 0 | 6 | 12 | 1 | 7 | 13 | 2 | 8 | 14 | 3 | 9 | 15 | 4 | 10 | 16 | 5 | 11 |
| PAT7 | 0 | 7 | 14 | 4 | 11 | 1 | 8 | 15 | 5 | 12 | 2 | 9 | 16 | 6 | 13 | 3 | 10 |
| PAT8 | 0 | 8 | 16 | 7 | 15 | 6 | 14 | 5 | 13 | 4 | 12 | 3 | 11 | 2 | 10 | 1 | 9 |

Table VI shows another desired set of patterns which is not stored but rather derived from the stored set of Table V by addressing each row in right to left order.

dot clock and also operates under modulo-N rules. The value stored in wraparound array counter 814 at the end of each display row (signalled by H-sync) is loaded into

TABLE VI

| | DERIVED BY BACKWARDS ADDRESSING | | | | | | | | | | | | | | | | |
|---|---|---|---|---|---|---|---|---|---|---|---|---|---|---|---|---|---|
| PAT9 | 9 | 1 | 10 | 2 | 11 | 3 | 12 | 4 | 13 | 5 | 14 | 6 | 15 | 7 | 16 | 8 | 0 |
| PATA | 10 | 3 | 13 | 6 | 16 | 9 | 2 | 12 | 5 | 15 | 8 | 1 | 11 | 4 | 14 | 7 | 0 |
| PATB | 11 | 5 | 16 | 10 | 4 | 15 | 9 | 3 | 14 | 8 | 2 | 13 | 7 | 1 | 12 | 6 | 0 |
| PATC | 12 | 7 | 2 | 14 | 9 | 4 | 16 | 11 | 6 | 1 | 13 | 8 | 3 | 15 | 10 | 5 | 0 |
| PATD | 13 | 9 | 5 | 1 | 14 | 10 | 6 | 2 | 15 | 11 | 7 | 3 | 16 | 12 | 8 | 4 | 0 |
| PATE | 14 | 11 | 8 | 5 | 2 | 16 | 13 | 10 | 7 | 4 | 1 | 15 | 12 | 9 | 6 | 3 | 0 |
| PATF | 15 | 13 | 11 | 9 | 7 | 5 | 3 | 1 | 16 | 14 | 12 | 10 | 8 | 6 | 4 | 2 | 0 |
| PATG | 16 | 15 | 14 | 13 | 12 | 11 | 10 | 9 | 8 | 7 | 6 | 5 | 4 | 3 | 2 | 1 | 0 |

Patterns 9, A ... F,G are just reverse orders of patterns -8. This simple change in address ordering increases the pattern generating capability of building ROM 830 for enabling wider programmability of the gray scales.

A step-mapping RAM 828 is placed at the address input port 829 of the phase-placement pattern-building ROM 830 to allow both forward reading and backward reading of each wraparound array stored within ROM 830. Thus, two wraparound arrays are derived from each stored wraparound array. RAM 828 is programmed by CPU 880 to allow for a wide variety of pixel counter 816 which also operates under modulo-N rules. Pixel counter 816 is clocked by the system dot-clock to drive the address input port 827 of the step-mapping RAM 828 which then maps the pixel count to point to a phase value stored within a selected wraparound array of the phase-placement ROM 830.

Figure 8B:
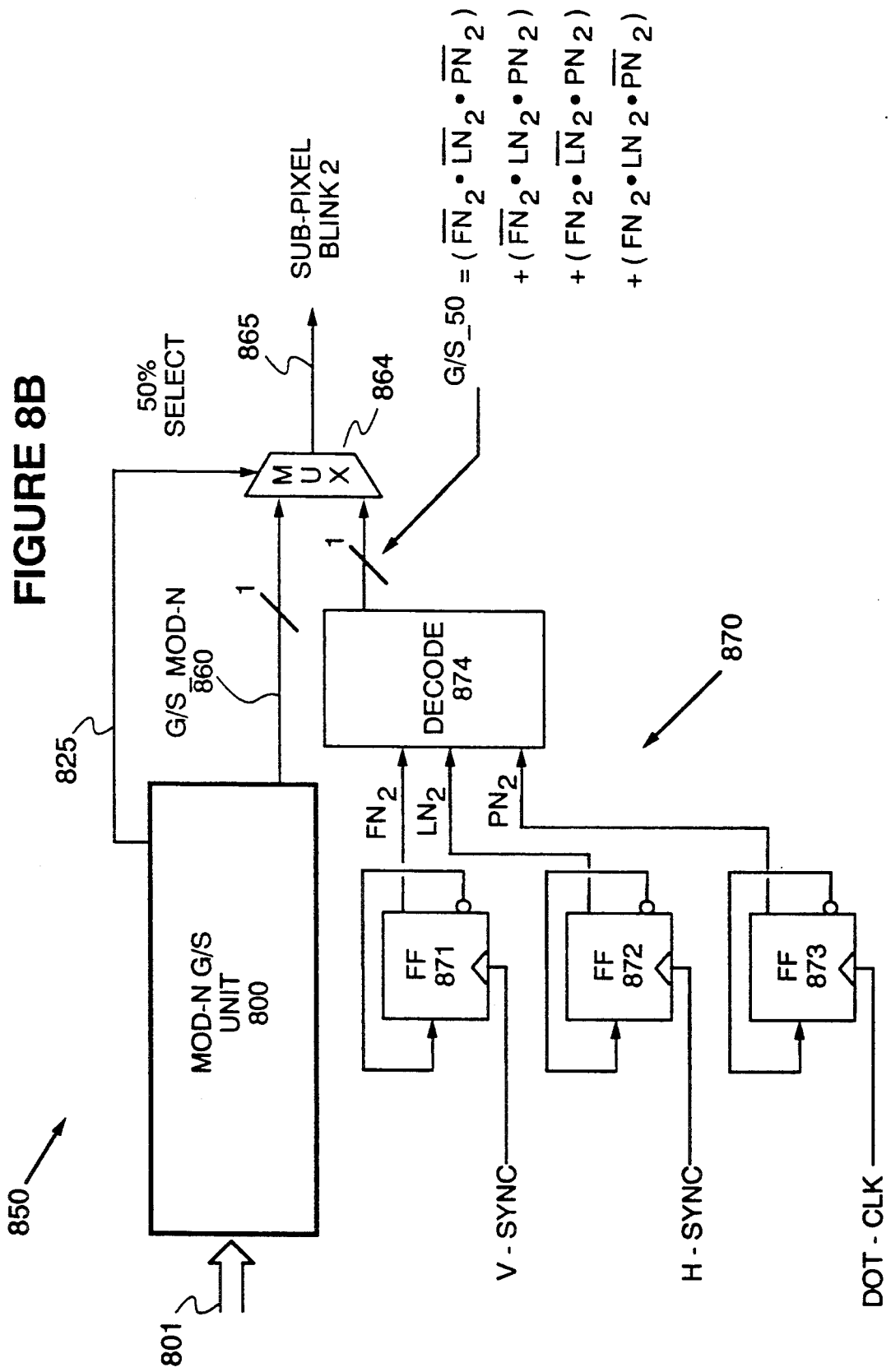
FIG. 8B shows the Modulo-N gray scaling circuit of FIG. 8A combined with a 50% gray scaling circuit.

The selection of which wraparound array will be used for each brightness level is made within a phase-pattern selecting random-access memory (RAM) 820. This pattern selecting RAM 820 converts each brightness level placed on input bus 801 into a five-bit wide pattern selecting word which is loaded into five-bit register 822 in synchronism with the system clock. The data contents of RAM 820 are downloaded from the CPU. Three bits output from the five-bit register 822 are applied to address input port 823 of the phase-placement pattern-building ROM 830 to select one out of its eight stored wraparound arrays. An additional bit output on line 824 of the five-bit register 82 drives the step-mapping RAM 828 to determine whether the phase numbers of the selected wraparound array will be read through from left to right or in some other order. Yet an additional bit output from the five-bit register 822 is transmitted along line 825 to an alternate shading circuit 870, which as shown in FIG. 8B, is a 50% shading circuit for generating the $M_{2 \times 2}$ matrix of FIG. 6. The modulo-N G/S circuit 800 is normally programmed for a value N greater than two (e.g., 3 or 17) and the additional shading circuit 870 of FIG. 8B generates 50% shading. Flip-flop 871 is toggled by the vertical sync clock between frame stop produce a modulo-2 version of the frame number, $FN_2$. Flip-flop 872 is toggled by the horizontal sync clock between display rows to produce a modulo-2 version of the line number, $LN_2$. Flip-flop 873 is toggled by the dot clock to produce a modulo-2 version of the pixel count or pixel number, $PN_2$. A decoder circuit 874 operates on these modulo-2 signals in accordance with the Boolean formula:

$$G/S_{50\%} = (\overline{FN_2} \cdot \overline{LN_2} \cdot \overline{PN_2}) + (\overline{FN_2} \cdot LN_2 \cdot PN_2) + (FN_2 \cdot \overline{LN_2} \cdot PN_2) + (FN_2 \cdot LN_2 \cdot \overline{PN_2})$$

The output signal $G/S_{50\%}$ of decoder 874 is applied to a first input terminal of multiplexor 864 while the output $G/S_{Mod-N}$ output on line 860 of gray scaling unit 800 is applied to the second input terminal of multiplexor 864. Selecting line 825 selects between the two input terminals of multiplexor 864 and outputs the selected signal on multiplexor output line 865 The output signal of line 865 commands the corresponding sub-pixel to blink either in accordance with the commands output by the mod-N gray scaling unit 800 or the 50% shading unit 870.

Figure 8C:
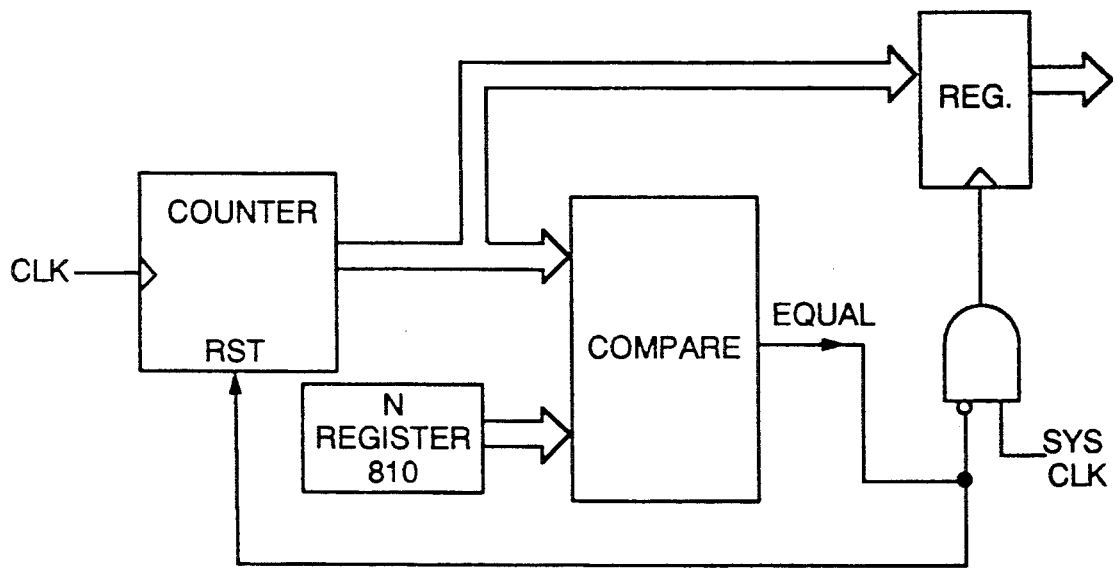
FIG. 8C shows a Modulo-N counter.

FIG. 8C shows the structure of a modulo-N counter where N is variable. The contents of the N holding register 810 are applied to a comparator together with the output of a regular 5-bit counter. If the output of the regular counter is equal to the value, N, the regular counter is reset. If the output of the regular counter is not equal to the value, N, then the regular counter output is passed through a register synchronized to the system clock, and this registered output is the output of the modulo-N counter circuit.

Figure 8D:
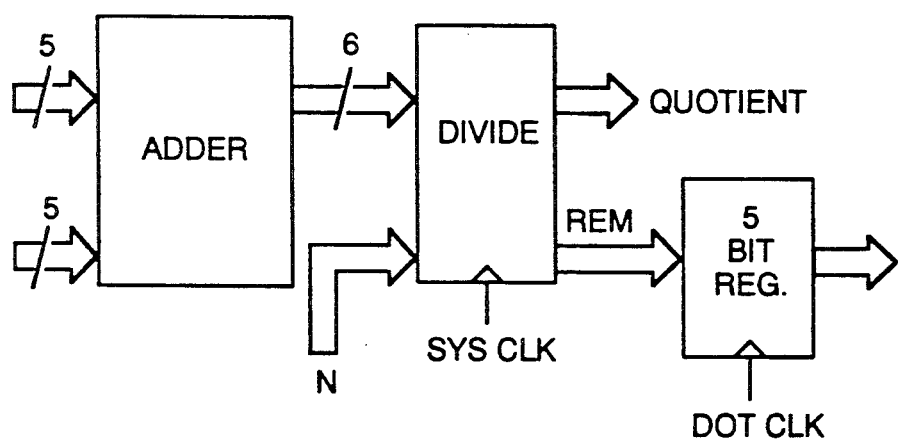
FIG. 8D shows a Modulo-N adder.

FIG. 8D shows the structure of a Modulo-N adder where N is variable. Two 5-bit words are summed in an adder to produce a 6-bit result. The result is divided in a divider by the value, N, which signal is provided from the N holding register 810. The remainder from the divide operation is stored in a 5-bit register which is clocked by the dot clock.

FIG. 9 shows a integrated circuit chip incorporating the gray scaling circuit of FIG. 8A. The integrated circuit 900 includes a color look-up RAM 910 whose internal data is organized as 256 color words, each color word being 18 bits long. The color look-up RAM 910 receives address input signals from either or both of a CPU 880 and a graphics control chip 890 to select a specific intensity for each of the red, green and blue phosphors on a conventional CRT 110. Six bits of the 18-bit output of the color look-up RAM 910 are applied to a red digital-to-analog converter 2100 whose output controls the red gun of the CRT 110. A further six bits of the color look-up RAM output ar applied to a green digital-to-analog converter (DAC) whose output is applied to the green gun of CRT 110. The last six bits of the color RAM output are applied to a blue DAC which drives the blue gun of CRT 110. Three comparators (only one shown) are respectively coupled to the analog outputs of the red, green, and blue DAC's to produce digitized versions of the analog outputs.

The 18-bit output signal of the color RAM 910 is also applied to each of three flat-panel shading circuits, respectively denoted as red shade unit 1100, green shade unit 1200 and blue shade unit 1300. These shading units, 1100, 1200 and 1300, produce sub-pixel blinking commands which are passed through a multiplexor 960 and through a flat panel interface circuit 965 to drive a colored flat panel display 310. A frame accelerating circuit 961 is optionally used in conjunction with a frame buffer 962 for flat panel displays 310 which require high refresh rates. When the frame accelerator 961 is used, the sub-pixel blink commands for a next-coming frame are temporarily stored in a frame buffer 962 while the blink commands for a current frame are passed directly through to the display 310. Then, when the display 310 is ready for the next frame worth of data, this is fetched from the frame buffer 962 while the driving chip 900 is starting to output th command bits for the third frame.

FIG. 10A is a block diagram showing the internal structure of the red shading unit 1100. It is to be understood that the green shading unit 1200 and blue shading unit 1300 each incorporate the same structure. As seen in FIG. 10A, the red shading unit 1100 has a color matching unit 1010 which receives the blue, green and red (B,G,R) intensity values from the color look-up RAM 910. These intensity values are mixed within the color matching unit 1010 in accordance with matching parameters provided by the CPU 880 to produce a matched red value R* which is applied to one input port of a multiplexor 1050. The second input port of multiplexor 1050 receives only the red value (R) directly from the color look-up RAM 910. A bypass signal provided by CPU 880 determines which of the direct red signal (R) or mixed red signal (R*) will be passed forward to a lesser significant bit stripping unit 1060.

Figure 12:
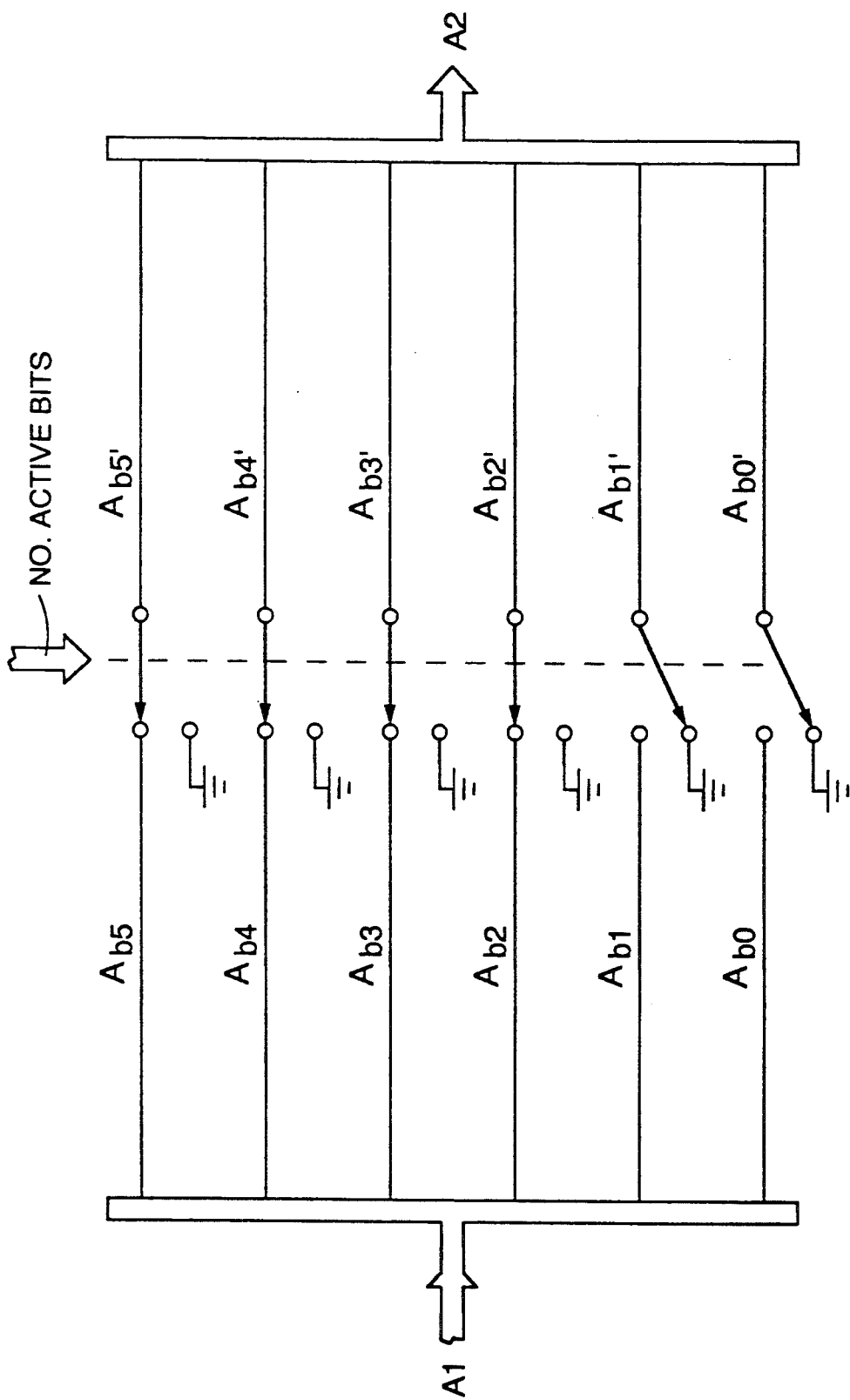
FIG. 12 is a schematic of the LSB strip-off unit shown in FIG. 10A.

For some displays, it is not possible to use all six bits output by multiplexor 1050. In such a case, the CPU 880 determines how many of the more significant bits will be active bits and resets the remaining bits to a value of zero. A block diagram of the LSB strip off unit 1060 is shown in FIG. 12.

Following the LSB strip off unit 1060 there is provided a pixels dithering unit 1070. The operation of this dithering unit 1070 may be bypassed through multiplexor 1075. When the dithering unit 1070 is not bypassed, it has a brightness offset to the brightness values to selected pixels, the selection occurring according to a two-by-two matrix. The matrix structure is determined by a matrix selecting number supplied from the CPU 880.

The brightness values output from multiplexor 1075 may not correspond directly to brightness values available on a given display. Accordingly, a brightness remapping RAM 1080 is provided for mapping each input brightness level to an available slot along the discrete levels of brightness available from the attached display unit. By way of example, the brightness spreading RAM 1080 is shown to have sixteen slots into which the 6-bit values from multiplexor 1075 need to be mapped. Some of the values from multiplexor 1075 may be redundantly mapped into a same output level so that these input levels become indistinguishable and finally displayed. The brightness spreading RAM 1080 also determines the spread between different brightness levels, and thus, the weights to be attributed to each brightness level for realizing gamma correction or other brightness weighting functions as desired. The mapping function of the brightness-spreading RAM 1080 are downloaded from the CPU 880.

The output of the brightness spreading RAM 1080 is directed through at least one of two or more gray scale generating units. The two or more gray scaling units may include the variable modulo-N unit 800 previously described, the 50% shading unit 870 also previously described and a gray scaling unit of fixed modulo number (e.g., modulo-3) 875. The output brightness level of RAM 1080 is also applied to a gray scale unit selecting module 910 which decides which of the two or more gray scaling units 800, 875 or 970 will command the pixel blinking output of the shading unit 1100. Selecting module 1090 operates multiplexor 1095 to select one of the gray scale units as the active gray scale unit for a particular sub-pixel.

Figure 10B:
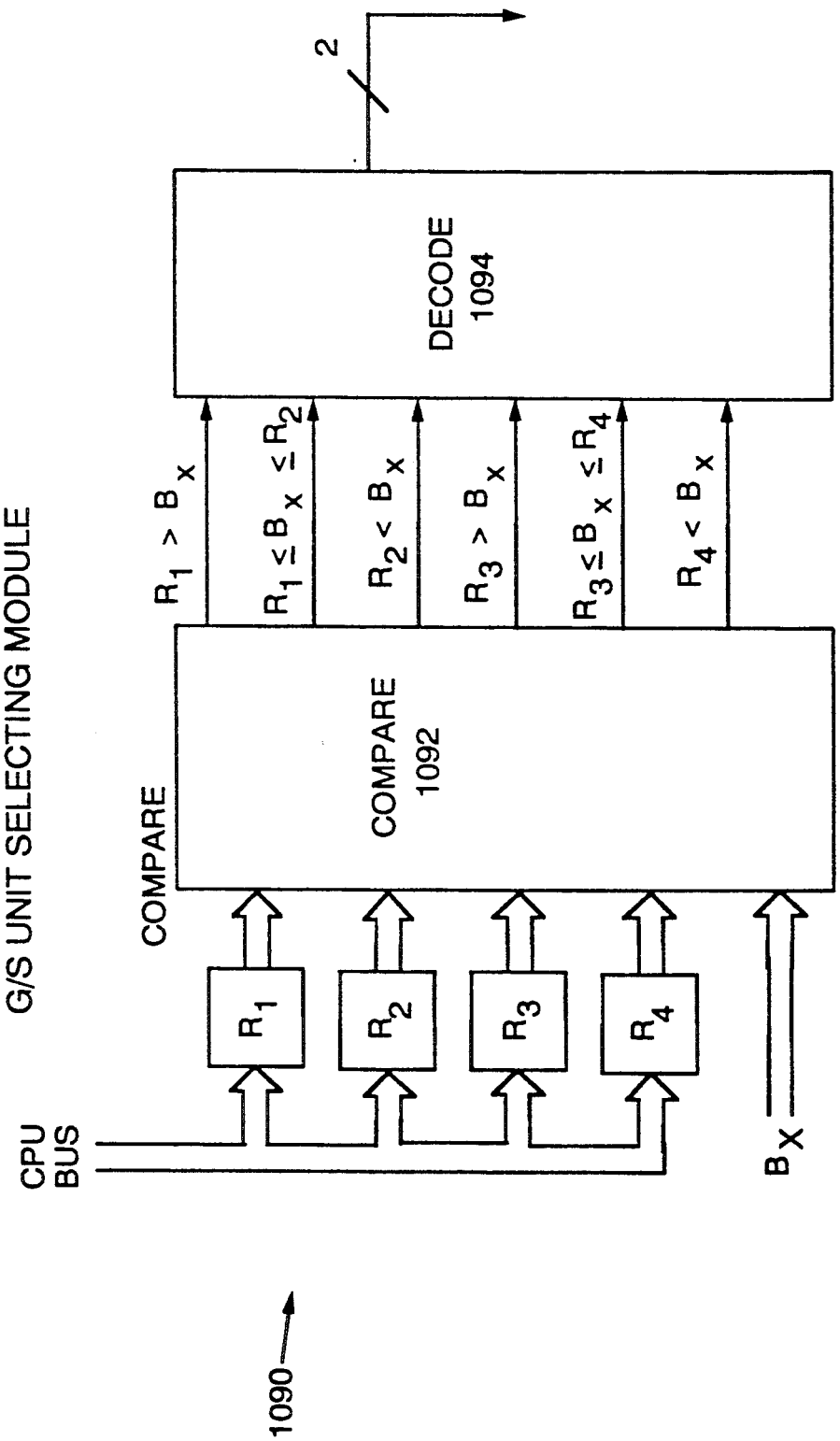
FIG. 10B shows the G/S unit selecting module of FIG. 10A.

Referring to FIG. 10B, a possible internal structure for the gray scale unit selecting module 1090 is shown. The CPU 880 loads range values into a plurality of range registers, $R_1$, $R_2$, $R_3$ and $R_4$. The input brightness level, $B_X$, is compared against these range values within a comparator 1092. The output of comparator 1092 is decoded by a decoder circuit 1094 to select which of the two or more gray scale units will be active for each range of brightness, $B_X$.

Referring to FIG. 11A, the internal structure of one color matching unit 1010 is shown. The red color produced by a LCD may not be of the same hue as that produced by a corresponding CRT. Accordingly, it may be necessary to mix the red, green and blue signals from the color RAM 910 in accordance with a linear equation of the form:

$$R^* = Rr^*(Red) + Gr^*(Green) + Br^*(Blue)$$

The CPU 880 loads the weighting functions Rr, Gr, Br into respective weighting registers 1011A, 1011B and 1011C. The R, G and B values received directly from the color look-up RAM 910 are then applied to respective multiplying units 1012a, 1012b and 1012c together with the weighting values, Rr, Gr, Br. The multiplication results are shifted right in respective shifting units 1014a, 1014b and 1014c to strip off their lesser significant bits. The truncated results are then added with an adding unit 1015 to produce the mixed value $R^*$.

Figure 11B:
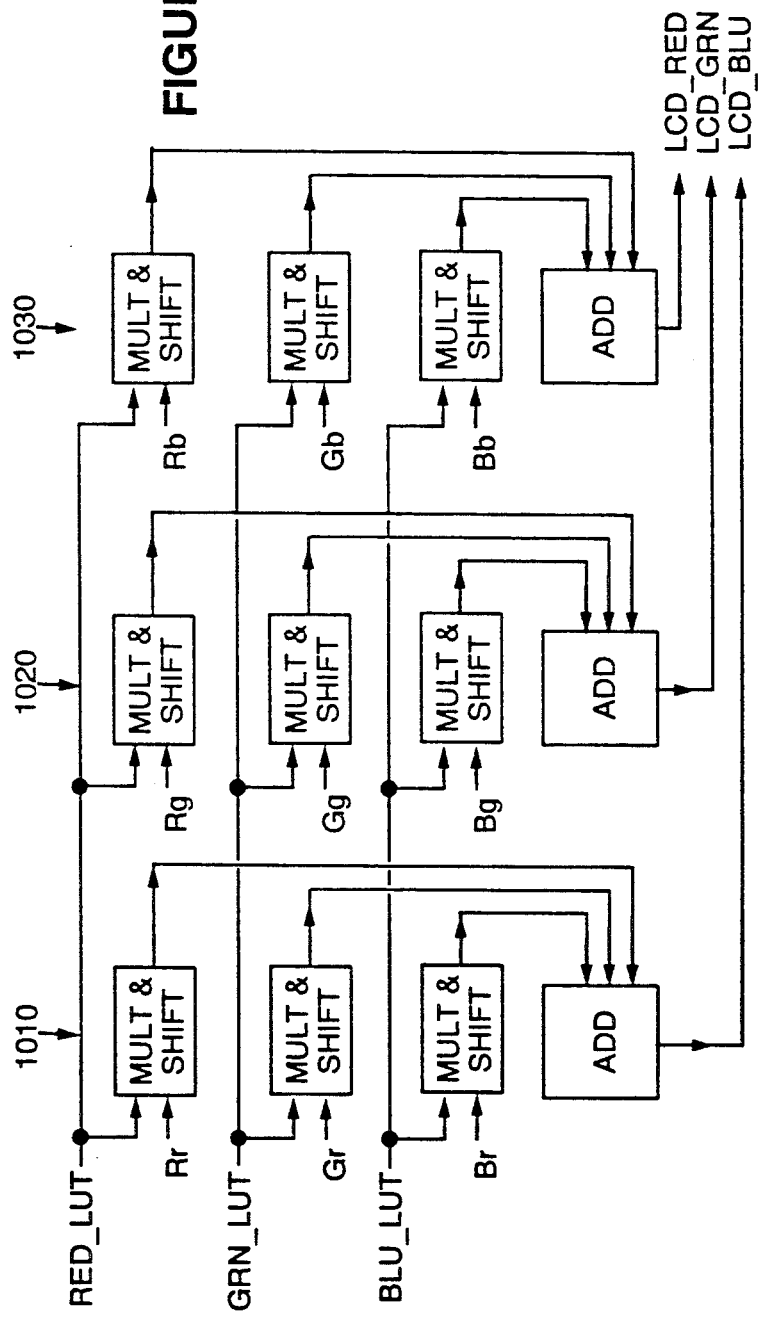
FIG. 11B shows the combined operation of three color matching units.
Figure 11C:
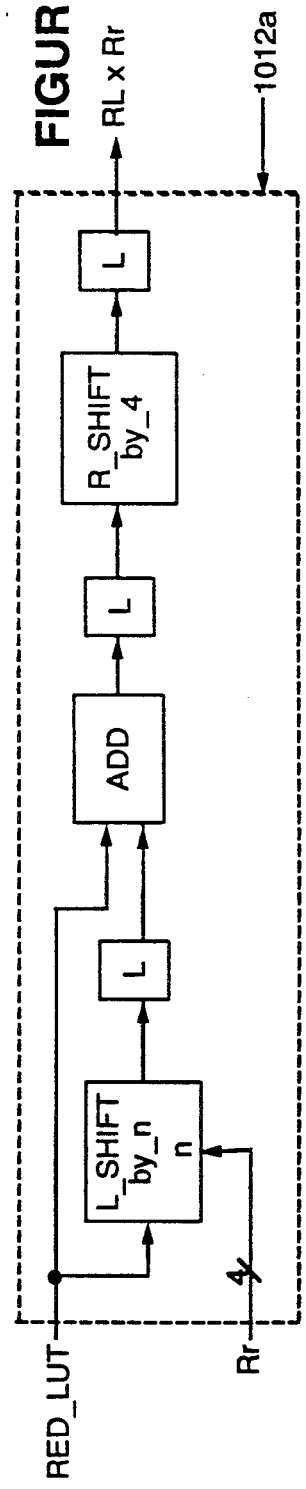
FIG. 11C shows a pipelined multiplying circuit.

Referring to FIG. 11B, the operation of all three color shading units, 1010, 1020 and 1030 is shown in unison Referring to FIG. 11C, the internal structure of a multiply and shift function is shown. The multiplication function is performed by a shift-by-n module which receives the value Rr as its value, N, and the red intensity (RED-LUT) as the binary word to be shifted. The original value (RED-LUT) is then added with the left-shifted value to produce a multiplication result. For enhancing throughput speed, a pipelining register, L, follows the adding function. Truncation is realized by a right shifting module following the pipeline register, L.

A further pipeline register, L, follows before the multiplication output signal (R L×Rr) is presented.

Referring to FIG. 13, the pixel dithering unit 1070 will be explained. The horizontal sync clock is applied to a first toggling flip-flop 1071. The dot clock is applied to a second toggling flip-flop 1072. The outputs of these flip-flops, 1071 and 1072, provide the address input signal for a four-by-one RAM 1073 whose bits are loaded from the CPU 880. The addressed output cell of dithering RAM 1073 is applied to a selection line of multiplexor 1074. The brightness level supplied from the LSB strip off unit 1060 is either passed directly through multiplexor 1074, or if not, a constant value stored within constant register 1076 is added to the strip off unit output value within an adding unit 1077 before being output. Typically, the constant register 1076 holds a value of one. The following dithering matrices may then be generated depending on the values loaded from the CPU 880.

| $B_x$ | $B_x$ | | $B_x - 1$ | $B_x$ | | $B_x - 1$ | $B_x$ | | $B_x + 1$ | $B_x$ |
|---|---|---|---|---|---|---|---|---|---|---|
| $B_x$ | $B_x$ | | $B_x$ | $B_x$ | | $B_x$ | $B_x + 1$ | | $B_x + 1$ | $B_x + 1$ |

In the above-illustrated matrices, $B_x$, is the brightness level received from the LSB strip off unit 1060. The output brightness from multiplexor 1074 is either B. or $B_x + 1$ depending on the row and column position of the pixel as well as the dithering matrix loaded into dithering RAM 1073 by the CPU.

It is to be understood that the above is merely exemplary of the inventions contemplated here. Numerous modifications will become apparent to those skilled in the art upon studying the above. Reference to the following claims should accordingly be made in order to determine the scope of the claimed invention.

What is claimed is:

1. A method of generating a pixel having a mixed color on a digitally commanded display, wherein the mixed color is formed from specified primary colors, each having a specified brightness, and the pixel comprises a plurality of colored sub-pixels and wherein each sub-pixel corresponds to a different one of the specified primary colors, the method comprising:

blinking each colored sub-pixel of the pixel at a selected rate to thereby set a unique time-averaged brightness for that sub-pixel over a selected plurality of frames, wherein the time-averaged brightness corresponds to the brightness specified for the selected primary color being provided by that sub-pixel.

2. The method of claim 1, wherein each sub-pixel has a ON state and an OFF state, and wherein in the blinking step the sub-pixel is commanded to be ON during a specified number of the selected plurality of frames, and commanded to be OFF during the remainder of the selected plurality of frames.

3. The method of claim 2, wherein the mixed color to be generated is specified by a digital code intended for use with a cathode ray tube display which produces primary colors of specific hues, and the digitally commanded display produces primary colors of hues different from those of the cathode ray tube display, further including the step of correcting for the difference in hues by mixing in amounts of the other primary colors.

4. The method of claim 2, wherein the sub-pixel is commanded to be OFF or ON by way of a brightness setting waveform having a plurality of consecutive bits in which each bit corresponds to a different phase of the brightness setting waveform and each phase of the brightness setting waveform provides a command for a frame in the selected plurality of frames, further including the steps of generating the mixed color for a plurality of adjacent pixels arrange din rows and columns; and applying different phases of the brightness setting waveform to sub-pixels of pixels adjacent one another, so that no two adjacent pixels receive the same phase of the brightness setting waveform at the same time.

5. The method of claim 4 wherein the applying step includes the step of defining a wrap-around sequence of a predetermined number of pixels in length, which designates a different phase from pixel to pixel with which the corresponding brightness waveform is to be applied to the sub-pixels of each pixel of the display;

defining a phase placement pattern which is associated with the brightness setting waveform, and which is constructed of the corresponding wrap around sequence, wherein the phase placement pattern for the corresponding wrap-around sequence is used in each row.

6. The method of claim 5, wherein the phase placement pattern for the corresponding wrap-around sequence is used in each row, but offset every A-rows by B-pixels.

7. An apparatus for generating a pixel having a mixed color on a digitally commanded display, wherein the mixed color is formed from specified primary colors, each having a specified brightness, and the pixel comprises a plurality of colored sub-pixels each sub-pixel corresponding to a different one of the specified primary colors, the apparatus comprising:

means for blinking each colored sub-pixel of the pixel at a selected rate over a selected plurality of frames to thereby set a unique time-averaged brightness for that sub-pixel corresponding to the brightness specified for the primary color being provided by that sub-pixel.

8. The apparatus of claim 7, wherein the blinking means comprise a plurality of gray scale generating means, each associated with a different one of the specified primary colors, for generating a brightness setting waveform which controls the state of an associated primary sub-pixel over the selected plurality of consecutive frames, wherein the brightness setting waveform commands the sub-pixel for the associated color towards an ON state during a specified number of the selected plurality of frames, and commands the sub-pixel towards an OFF state during the remainder of the selected plurality of consecutive frames.

9. The apparatus of claim 8, wherein the mixed color is generated for a plurality of adjacent pixels arranged in rows and columns, and further wherein the brightness setting waveform has a plurality of consecutive bits in which each bit corresponds to a different phase of the brightness setting waveform and each phase of the brightness setting waveform provides a command for a frame in the selected plurality of consecutive frames, and further including means for applying different phases of the brightness setting waveform to sub-pixels of pixels adjacent one another, so that no two adjacent pixels receive the same phase of the brightness setting waveform at the same time.

10. The apparatus of claim 9 wherein the applying means includes means for defining a wrap-around sequence of a predetermined number of pixels in length, which designates a different phase from pixel to pixel with which the corresponding brightness waveform is to be applied to the sub-pixels of each pixel of the display; and means for defining a phase placement pattern which is associated with the brightness setting waveform, and which is constructed of the corresponding wrap around sequence, wherein the phase placement pattern for the corresponding wrap-around sequence is used in each row of the plurality of pixels.

11. An apparatus for controlling a pixel on a digitally commanded display to produce a mixed color, wherein the mixed color is formed from specified primary colors, each having a specified brightness, and further wherein the pixel comprises a plurality of colored sub-pixels, each of which provides a different one of the specified primary colors, the apparatus comprising:

a plurality of means each of which is associated with a different one of the sub-pixels for controlling the associated sub-pixel using a frame rate duty cycle approach to produce over a designated plurality of consecutive frames a time-averaged brightness which corresponds to the brightness specified for the primary color provided by the sub-pixel, wherein the sub-pixel is commanded to be either ON or OFF during each frame in the designated plurality of consecutive frames.

12. The apparatus of claim 11, wherein sub-pixel provides a primary color having a hue which is different from a desired primary color, and further including color matching means for adjusting the primary color produced by the sub-pixel by controlling others of the sub-pixels to provide selected adjustment intensities of their associated primary colors, so that the combined intensities of the primary colors provide an adjusted primary color which substantially matches the hue of the desired primary color.

13. The apparatus of claim 12 wherein CRT intensities are specified for red, blue and green primary colors which provide a first color when mixed, wherein in the digitally commanded display a red sub-pixel provides a red primary color, a blue sub-pixel provides a blue primary color, and a green sub-pixel provides a green primary color, and further wherein the red, green and blue sub-pixels provide primary colors having hues which are different from desired primary color hues, and further wherein adjustment intensities of the red, blue and green sub-pixels are specified for adjusting the respective primary colors provided by each of the sub-pixels, and further wherein the color matching means comprise red multiplying means for forming multiplication products between the specified red CRT intensity and the red sub-pixel adjustment intensity specified for adjusting the red sub-pixel primary color, between the specified green CRT intensity and the green sub-pixel adjustment intensity specified for adjusting the red sub-pixel primary color, and between the specified blue CRT intensity and the blue sub-pixel adjustment intensity specified for adjusting the red sub-pixel primary color;

red summing means coupled to the red multiplying means for summing together the formed multiplication products to provide an adjusted red sub-pixel intensity;

green multiplying means for forming multiplication products between the specified red CRT intensity and the red sub-pixel adjustment intensity specified for adjusting the green sub-pixel primary color, between the specified green CRT intensity and the green sub-pixel adjustment intensity specified for adjusting the green sub-pixel primary color, and between the specified blue CRT intensity and the blue sub-pixel adjustment intensity specified for adjusting the green sub-pixel primary color;

green summing means coupled to the green multiplying means for summing together the formed multiplication products to provide an adjusted green sub-pixel intensity;

blue multiplying means for forming multiplication products between the specified red CRT intensity and the red sub-pixel adjustment intensity specified for adjusting the blue sub-pixel primary color, between the specified green CRT intensity and the green sub-pixel adjustment intensity specified for adjusting the blue sub-pixel primary color, and between the specified blue CRT intensity and the blue sub-pixel adjustment intensity specified for adjusting the blue sub-pixel primary color; and blue summing means coupled to the blue multiplying means for summing together the formed multiplication products to provide an adjusted blue sub-pixel intensity.

14. The apparatus of claim 13 wherein the red, blue and green multiplying means are each a multiply and shift module.

15. The apparatus of claim 11 wherein a number, N, of CRT mixed colors is specified and a number, M, of brightnesses can be generated by each of the plurality of controlling means, further including
means for mapping each of the N CRT mixed colors to the M brightness levels.

16. The apparatus of claim 11 further including in each of the plurality of controlling means:
means for defining a square matrix of pixels on the digitally commanded display; and
means for controlling a sub-pixel of at least one of the of pixels in the square matrix to have a first brightness, and for controlling a sub-pixel in each of the remainder of the pixels in the square matrix to have a second brightness different from the first brightness, so that an effective brightness is provided for the square matrix which falls in between the first and second brightnesses.

17. The apparatus of claim 11 wherein each of the plurality of controlling means includes
fixed means for controlling the associated sub-pixel using a frame rate duty cycle approach to produce a fixed number of time averaged brightnesses over a fixed number of consecutive frames, wherein the sub-pixel is commanded to be either ON or OFF during each frame in the predetermined number of consecutive frames; and
programmable means for controlling the associated sub-pixel using a frame rate duty cycle approach to produce a programmable number of time averaged brightnesses over a programmable number of consecutive frames, wherein the sub-pixel is commanded to be either ON or OFF during each frame in the predetermined number of consecutive frames.

18. The apparatus of claim 11 wherein each of the plurality of controlling means provide a programmable number of time averaged brightnesses over a programmable number of consecutive frames.

* * * * *